United States Patent
Lu et al.

(10) Patent No.: US 10,713,761 B2
(45) Date of Patent: Jul. 14, 2020

(54) METHOD AND APPARATUS TO PERFORM LOCAL DE-NOISING OF A SCANNING IMAGER IMAGE

(71) Applicant: The Trustees of Columbia University in the City of New York, New York, NY (US)

(72) Inventors: Lin Lu, New York, NY (US); Binsheng Zhao, Forest Hills, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 65 days.

(21) Appl. No.: 16/085,611

(22) PCT Filed: Mar. 14, 2017

(86) PCT No.: PCT/US2017/022292
§ 371 (c)(1),
(2) Date: Sep. 17, 2018

(87) PCT Pub. No.: WO2017/160829
PCT Pub. Date: Sep. 21, 2017

(65) Prior Publication Data
US 2019/0073748 A1    Mar. 7, 2019

Related U.S. Application Data

(60) Provisional application No. 62/308,467, filed on Mar. 15, 2016.

(51) Int. Cl.
*G06T 5/00* (2006.01)
*G06K 9/62* (2006.01)
(Continued)

(52) U.S. Cl.
CPC ............ *G06T 5/002* (2013.01); *G06K 9/40* (2013.01); *G06K 9/4619* (2013.01);
(Continued)

(58) Field of Classification Search
CPC .......... G06T 2207/10116; G06T 5/002; G06T 7/0012; G06T 2207/30061
See application file for complete search history.

(56) References Cited

U.S. PATENT DOCUMENTS 5,457,754 A    10/1995   Han et al.
7,050,618 B2 *  5/2006   Belykh ................. G06T 5/10
                                                 382/132
(Continued)

OTHER PUBLICATIONS

Chatterjee P, "Clustering-based denoising with locally learned dictionaries", IEEE Transactions on Image Processing, v18(7), pp. 1-14, 2009.

(Continued)

*Primary Examiner* — Yosef Kassa
(74) *Attorney, Agent, or Firm* — Beusse Wolter Sanks & Maire; Eugene J. Molinelli

(57) ABSTRACT

A method is provided to perform local de-noising of an image. The method includes obtaining a region of interest and a region of noise within a scan. The method also includes determining, for a first image based on the region of interest and a second image based on the region of noise, sample blocks and atoms for each image, where each atom contributes to a weighted sum that approximates a sample block in the image. The method also includes determining a measure of similarity of each atom from the first image with atoms from the second image and removing an atom from the first image if the measure of similarity exceeds a predetermined threshold value. The method also includes reconstructing a de-noised image based on atoms remaining (Continued)

in the first image after removing the atom from the first image, and presenting the de-noised image on a display device.

24 Claims, 19 Drawing Sheets

(51) Int. Cl.
*G06K 9/40* (2006.01)
*G06K 9/46* (2006.01)
*G06T 7/00* (2017.01)
*G06K 9/32* (2006.01)

(52) U.S. Cl.
CPC ......... *G06K 9/4642* (2013.01); *G06K 9/6215* (2013.01); *G06K 9/6249* (2013.01); *G06T 7/0012* (2013.01); *G06K 9/3233* (2013.01); *G06K 2209/051* (2013.01); *G06T 2207/10081* (2013.01); *G06T 2207/10088* (2013.01); *G06T 2207/10104* (2013.01); *G06T 2207/20021* (2013.01); *G06T 2207/20052* (2013.01); *G06T 2207/20064* (2013.01); *G06T 2207/20076* (2013.01); *G06T 2207/20081* (2013.01); *G06T 2207/30008* (2013.01); *G06T 2207/30056* (2013.01); *G06T 2207/30064* (2013.01); *G06T 2207/30096* (2013.01)

(56) References Cited

U.S. PATENT DOCUMENTS

| | | | | |
|---|---|---|---|---|
| 7,174,038 B2* | 2/2007 | Belykh | ...................... | G06T 5/10 378/164 |
| 7,486,406 B2* | 2/2009 | Kim | ...................... | G01B 9/021 356/457 |
| 7,697,658 B2* | 4/2010 | Wang | ...................... | G06T 11/006 378/4 |
| 7,801,274 B1* | 9/2010 | Isaksen | .................. | A61B 6/145 378/38 |
| 8,165,215 B2 | 4/2012 | Aharon et al. | | |
| 8,355,552 B2 | 1/2013 | Schwartz et al. | | |
| 8,396,310 B1 | 3/2013 | Kadambe et al. | | |
| 8,532,262 B2* | 9/2013 | Iwakiri | ............... | A61B 6/4233 250/370.09 |
| 8,952,333 B2* | 2/2015 | Yu | .......................... | A61B 6/037 250/363.03 |
| 2013/0230224 A1 | 9/2013 | Claude et al. | | |
| 2015/0227819 A1 | 2/2015 | Kaisha | | |
| 2015/0078641 A1 | 3/2015 | Tan et al. | | |

OTHER PUBLICATIONS

Chen Y, et al, "Artifact suppressed dictionary learning for low-dose CT image processing" IEEE Transactions on Medical Imaging, v33(12), pp. 1-22, 2014.
Dong W, et al, "Sparsity-based image denoising via dictionary learning and structural clustering", IEEE Conference on Computer Vision and Pattern Recognition, pp. 1-8, 2011.
Elad M, et al, "Image Denoising via Sparse and Redundant Representations over Learned Dictionaries," IEEE Transactions on Image Processing, v15(12), pp. 3736-3745, 2006.
Wahlberg B, et al. "An ADMM algorithm for a class of total variation regularized estimation problems" IFAC Proceedings Volumes, v45(16): 83-88, 2012.
Xu Q, et al, "Low-dose x-ray CT reconstruction via dictionary learning", IEEE Transactions on medical imaging, v31(9), pp. 1-16, 2012.
International Search Report and Written Opinion for the corresponding PCT Application No. PCT/US2017/072292, dated May 31, 2017, pp. 1-14.
Bajaj, "Multi-scale Bio-Modeling and Visualization," Oct. 25, 2010, pp. 1-10.
Thapa, "Image Restoration Methods for Retinal Images: Denoising and Interpolation," Apr. 27, 2015, pp. 1-22.
Jurrus, et al., "Axon tracking in serial block-face scanning electron microscopy," In: Medical image analysis, Feb. 2009, pp. 1-18.

* cited by examiner

FIG. 2I
291 LOW FREQUENCY SUB-BAND IMAGE
290 SWT
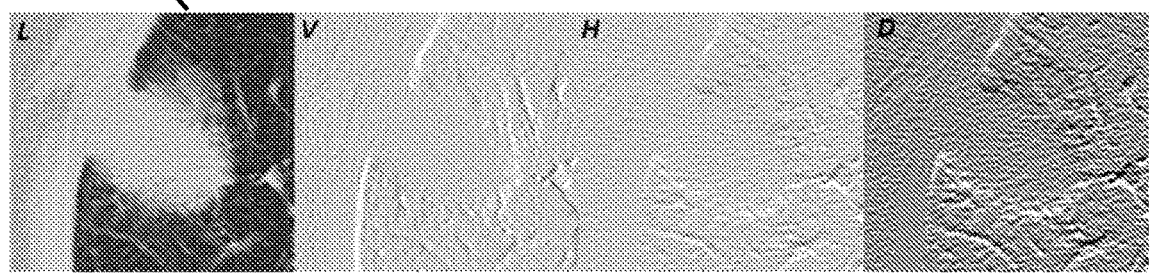
295 LEVEL-2 SWT
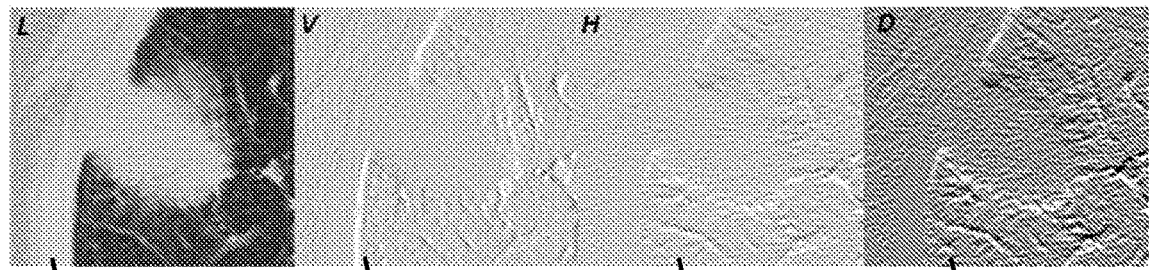
296 LEVEL-2 LOW FREQUENCY SUB-BAND IMAGE
297 LEVEL-2 FIRST HIGH FREQUENCY SUB-BAND IMAGE
298 LEVEL-2 SECOND HIGH FREQUENCY SUB-BAND IMAGE
299 LEVEL-2 THIRD HIGH FREQUENCY SUB-BAND IMAGE

402 REGION OF INTEREST IMAGE

404 DE-NOISED REGION OF INTEREST IMAGE

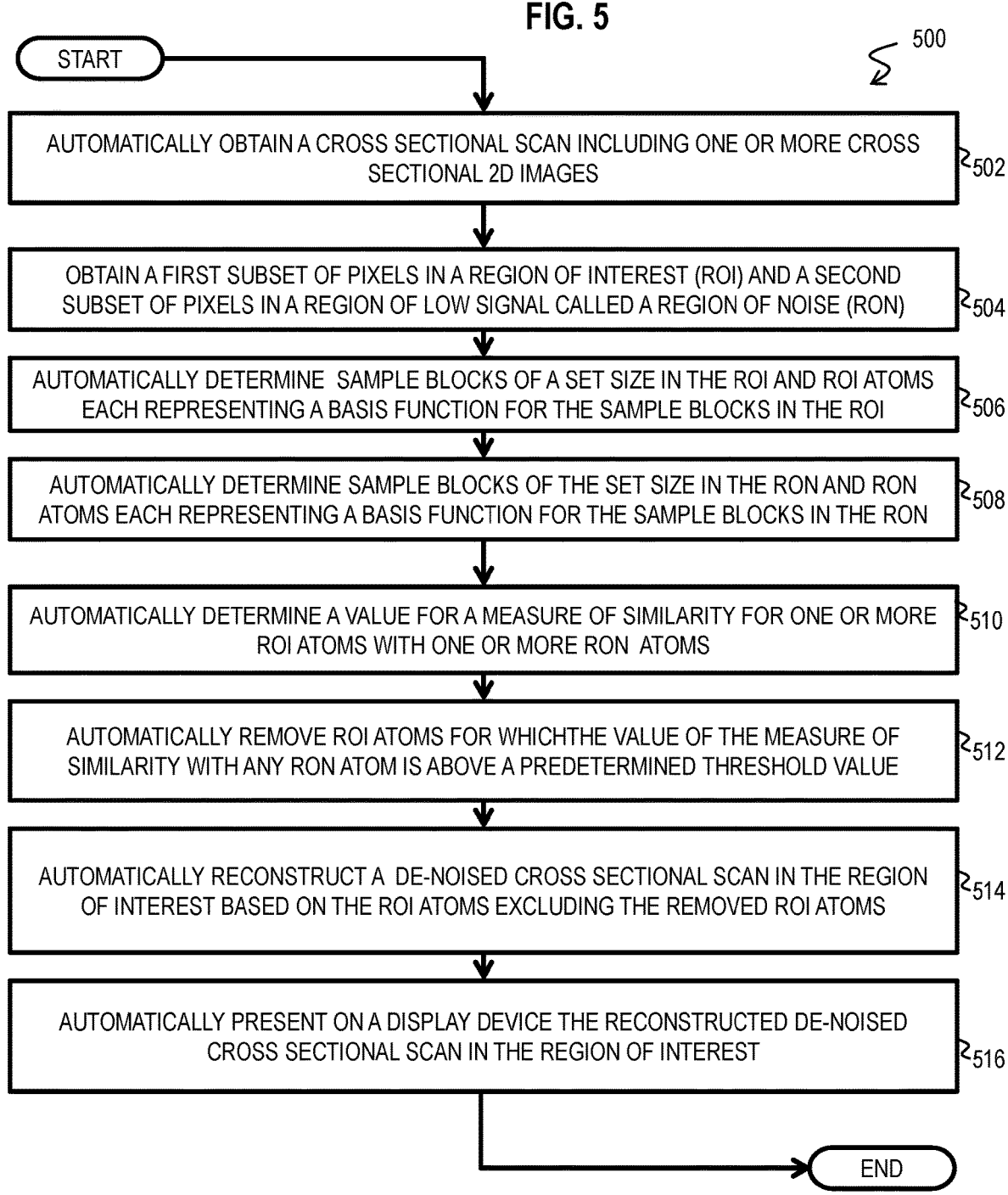

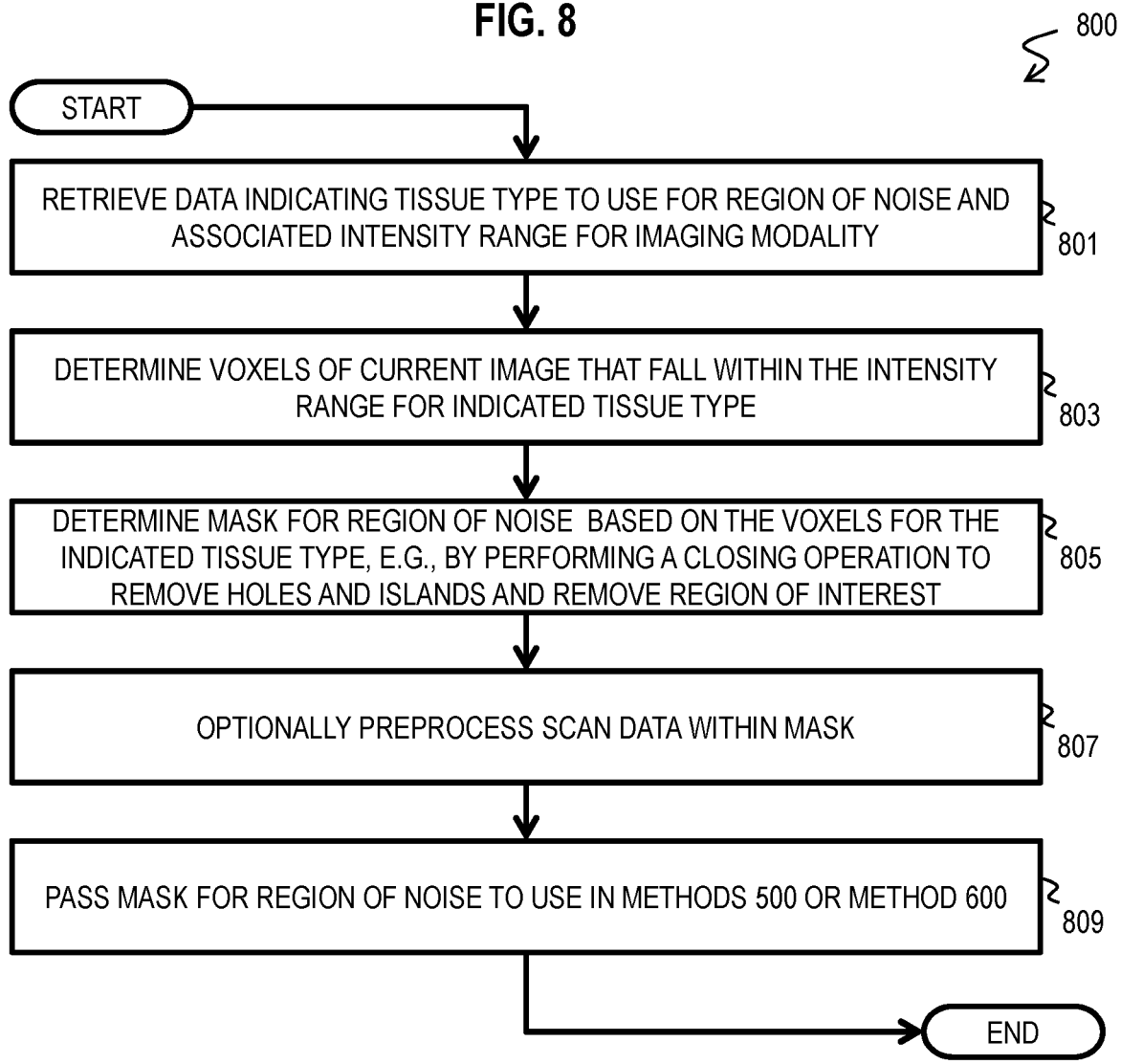

FIG. 9A
FIG. 9B
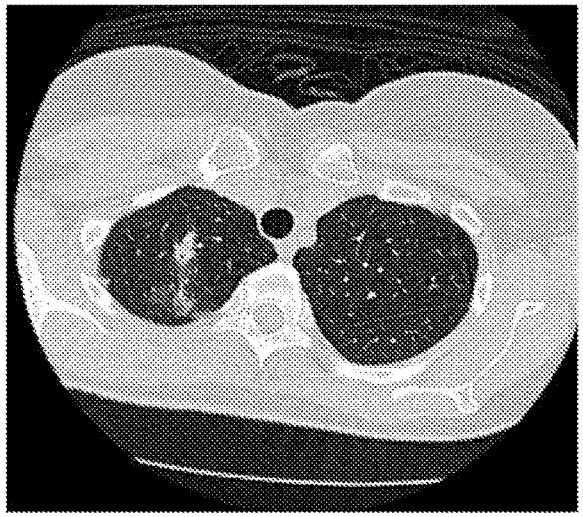
950

METHOD AND APPARATUS TO PERFORM
LOCAL DE-NOISING OF A SCANNING
IMAGER IMAGE

CROSS-REFERENCE TO RELATED APPLICATIONS

This application is a 371 national stage application of PCT Application No. PCT/US17/22292, filed Mar. 14, 2017, and claims benefit of Provisional Appln. 62/308,467, filed Mar. 15, 2016, the entire contents of which are hereby incorporated by reference as if fully set forth herein, under 35 U.S.C. § 119(e).

BACKGROUND

The ability of radiologists to make accurate diagnosis, prognosis and risk assessment is dependent on obtaining consistent, low-noise images. Image noise can vary from using different image acquisition settings, where subsequent comparison of images taken at different times or locations may result in inconsistencies. Such problems can lead to difficulties in objectively comparing multiple scans with each other for research, diagnosis, and treatment evaluation.

SUMMARY

It is here recognized that conventional methods to de-noise images are deficient, since these methods perform de-noising across the entire image and are only compatible for certain acquisition settings and equipment. Techniques are provided to perform local de-noising of an image by representing portions of the image as a plurality of basis functions and suppressing contributions of those basis functions considered to characterize noise.

In a first set of embodiments, a method is provided to perform local de-noising of an image. The method includes obtaining automatically on a processor a cross sectional scan comprising one or more cross sectional 2D images. The method also includes obtaining a first subset of pixels in a region of interest within the cross sectional scan and a second subset of pixels in a non-overlapping region of noise within the cross sectional scan. The method also includes determining automatically on a processor, for each of a first image based on the region of interest and a second image based on the region of noise, a plurality of subareas, called sample blocks, each sample block having a same predetermined size small compared to the image, and determining a plurality of basis functions called atoms, each atom having the predetermined size, wherein each atom contributes substantially to a weighted sum that closely approximates at least one sample block in the image, wherein atoms in the second image are determined independently from the atoms in the first image. The method also includes determining automatically on a processor for each atom from the first image a value for a measure of similarity with a plurality of atoms from the second image. The method also includes removing an atom from the first image if the value of the measure of similarity with an atom from the second image is above a predetermined threshold value, whereby the atom from the first image is considered to characterize noise. The method also includes reconstructing a de-noised cross sectional scan in the region of interest automatically on a processor based only on atoms remaining in the first image after removing the atom from the first image. The method also includes automatically presenting the reconstructed de-noised cross-sectional scan of the region of interest on a display device.

In other sets of embodiments, a system is configured, or non-transitory computer-readable medium configures an apparatus, to perform one or more steps of one or more of the above methods.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which:

FIG. 2I is a set of images that illustrate an example of a level-2 SWT of the low frequency sub-band image of the SWT of FIG. 2H over the directions of FIG. 2G, according to an embodiment;

FIG. 5 is a flow diagram that illustrates an example method to perform local de-noising an image, according to one embodiment;

FIG. 8 is a flow diagram that illustrates an example automated method to determine a region of noise (RON), according to one embodiment;

FIG. 9A and FIG. 9B are images that illustrate an example automatically-determined RON, according to one embodiment;

DETAILED DESCRIPTION

A method is described to perform local de-noising of an image by representing the image as a plurality of basis functions and suppressing contributions of those basis functions considered to characterize noise. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5× to 2×, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of a method to perform local de-noising of an image of a liver nodule or a lung lesion using learned atom dictionaries in an image with one region of interest (ROI) and one region of noise (RON) with or without pre-processing to determine transforms using orthogonal basis functions such as wavelets. However, the invention is not limited to this context. In other embodiments, the method is performed to locally de-noise other medical images of other anatomical features or to de-noise images of other subjects, living or inanimate, natural or man-made, using other basis functions, with or without pre-processing, determined in other ways with more than one ROI or RON or both.

1. OVERVIEW

Figure 1:
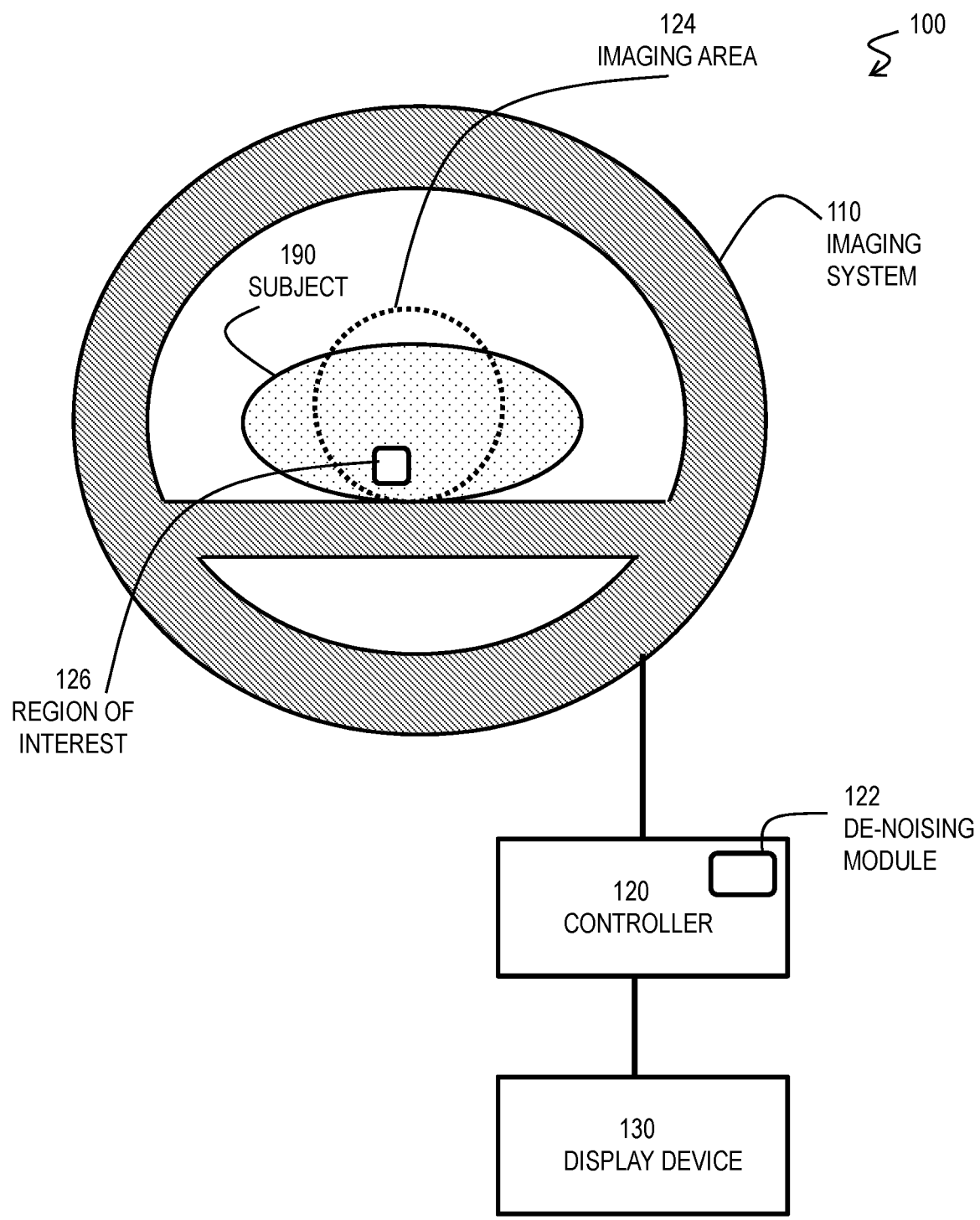
FIG. 1 is a block diagram that illustrates an example of an apparatus to perform local de-noising of an image, according to one embodiment.

FIG. 1 is a block diagram that illustrates an example of an apparatus 100 to perform local de-noising of an image, according to one embodiment. For purposes of illustration, a living subject 190 is depicted, but is not part of the apparatus 100. The apparatus 100 includes one or more imaging systems 110 that are used to scan images of the subject 190 within a cross-sectional imaging area 124 that encompasses a region of interest 126 within the subject 190. In an example embodiment, the region of interest 126 includes a lesion or tumor cells within the subject 190. The imaging system 110 is non-invasive and obtains cross-sectional images that are axially stacked to generate three dimensional (3D) imaging data. In an example embodiment, the imaging system 110 is one of a computerized tomography (CT) device to capture a CT scan, a magnetic resonance imaging (MRI) system to capture an MRI scan or a positron emission tomography (PET) system to capture a PET scan. However, the imaging system 110 is not limited to any specific type of system and includes any known imaging system appreciated by one skilled in the art to capture a cross-sectional scan of the imaging area 124 within the subject 190.

Figure 13:
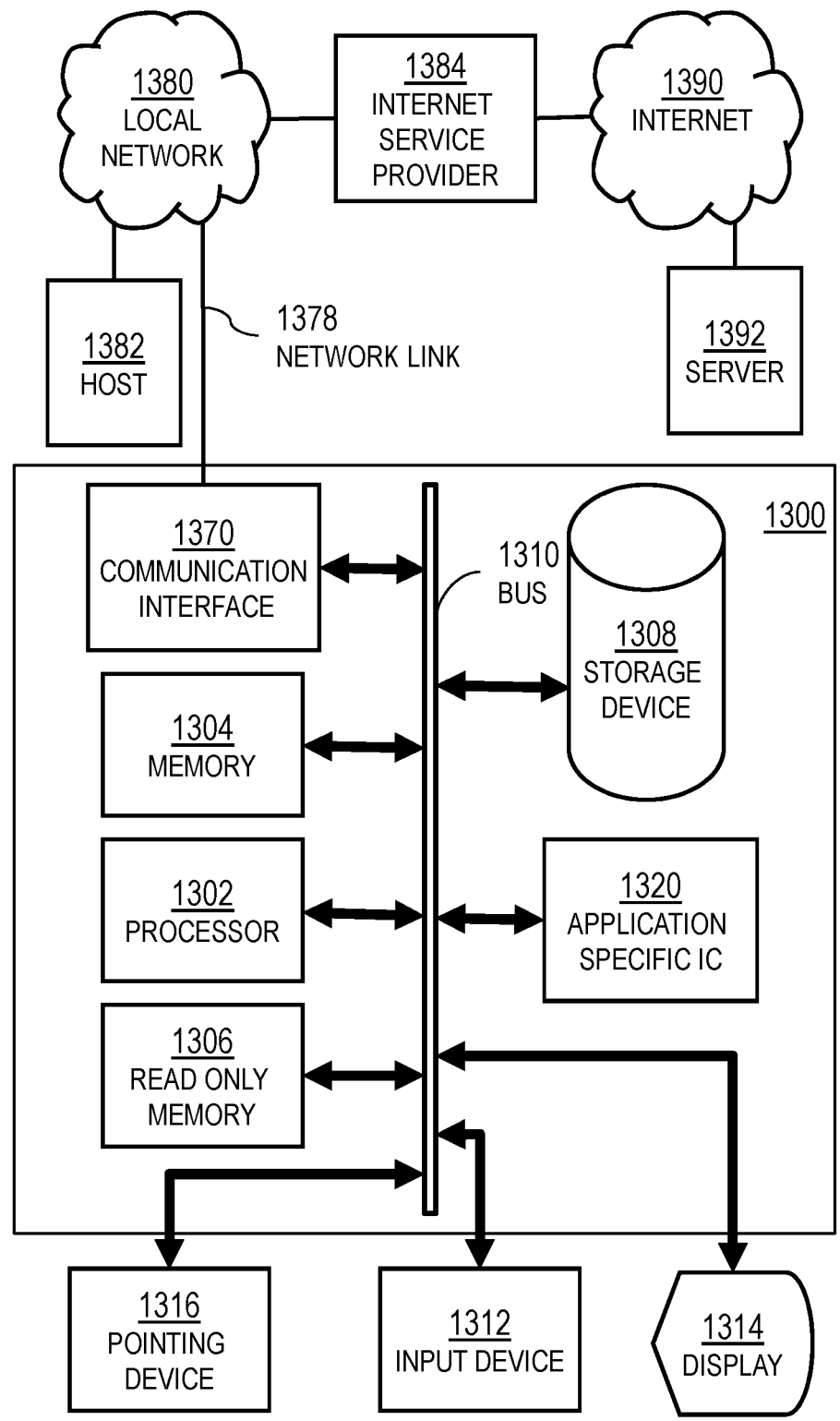
FIG. 13 is a block diagram that illustrates a computer system upon which an embodiment of the invention may be implemented.
Figure 14:
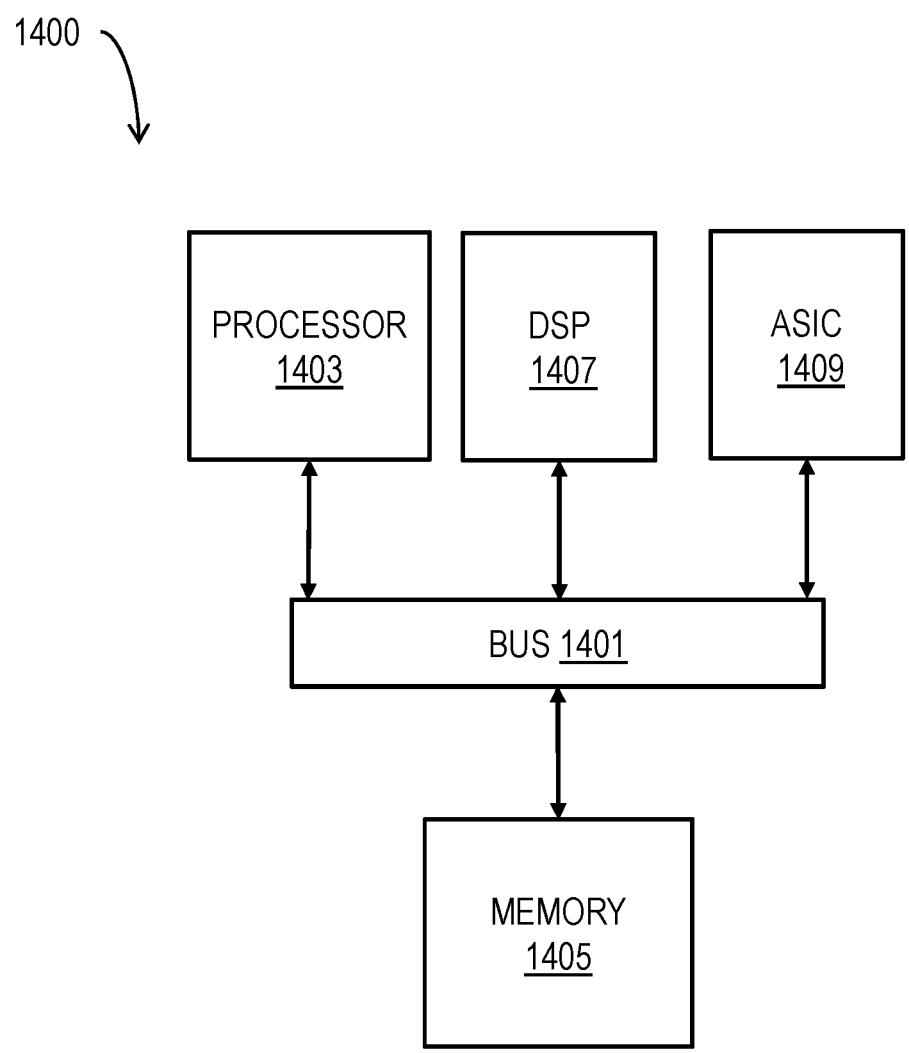
FIG. 14 is a block diagram that illustrates a chip set upon which an embodiment of the invention may be implemented.

Imaging data is transmitted from the imaging system 110 to a controller 120 which forms a cross-sectional scan of the imaging area 124 based on the imaging data. In an embodiment, a cross-sectional scan of the imaging area 124 is formed by the imaging system 110 and is transmitted to the controller 120. Image noise is introduced into the imaging data and the cross-sectional scan, based on different image acquisition settings of the imaging system 110. Based on the method discussed herein, a de-noising module 122 of the controller 120 removes the noise from a cross-sectional image within the scan. The method enables cross-sectional images obtained using different imaging systems and/or different acquisition settings to be consistently compared. The controller 120 transmits the de-noised cross-sectional image to a display device 130, where the de-noised cross-sectional image is displayed. In various embodiments, the controller 120 comprises one or more general purpose computer systems, as depicted in FIG. 13 or one or more chip sets as depicted in FIG. 14 and in some embodiments includes instructions to cause the computer or chip set to perform one or more steps of a method described below with reference to FIG. 5.

Figure 2A:
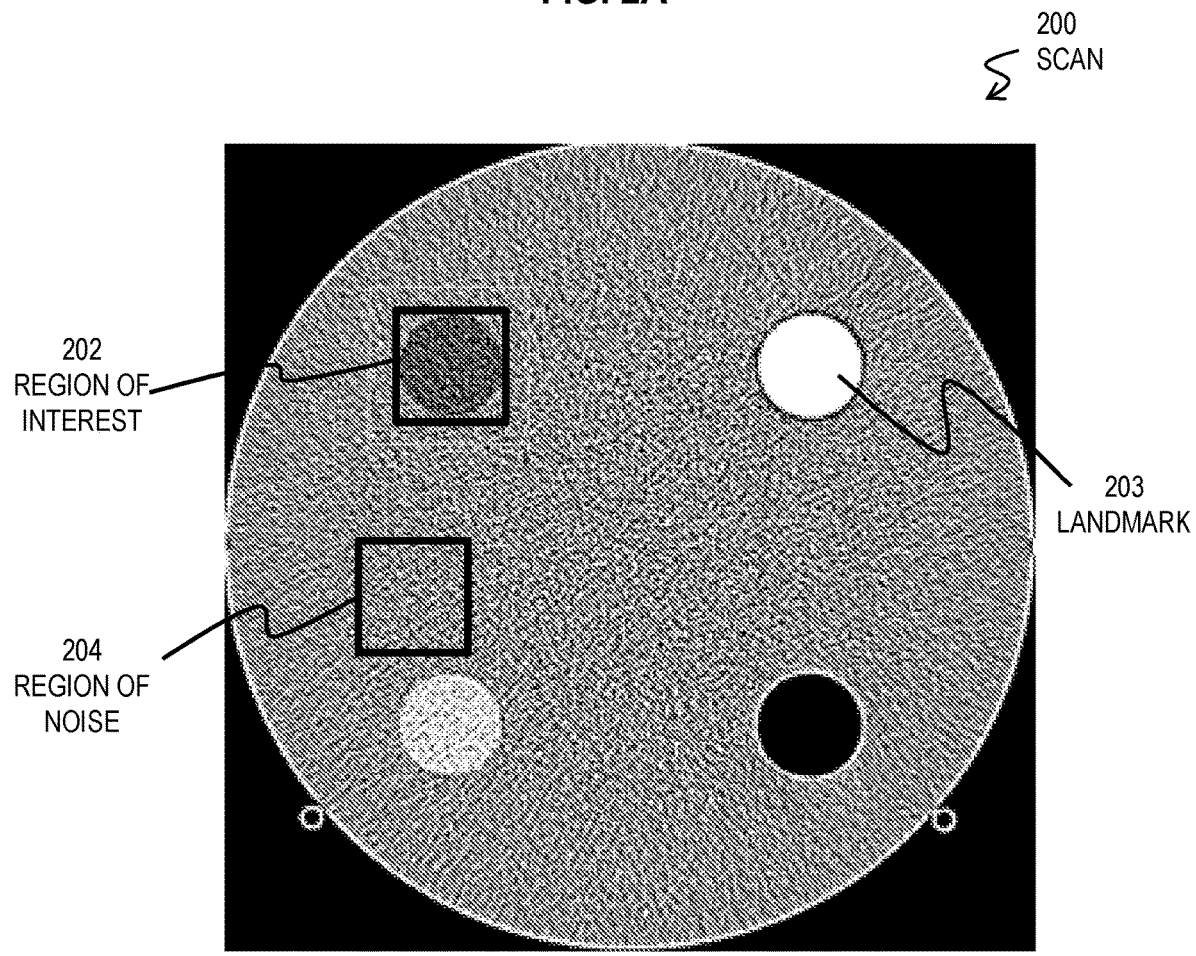
FIG. 2A is an image that illustrates an example of a cross-sectional scan, according to one embodiment.
Figure 2B:
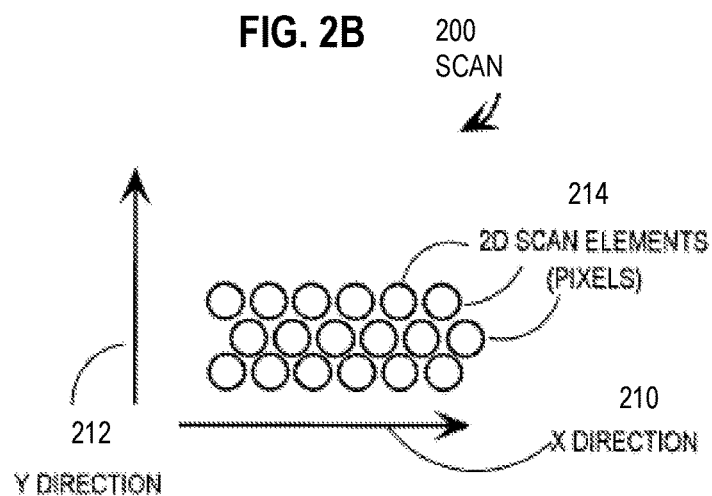
FIG. 2B is a block diagram that illustrates scan elements in a 2D scan, such as the cross-sectional scan of FIG. 2A, according to one embodiment.

FIG. 2A is an image that illustrates an example of a cross-sectional scan 200 of the imaging area 124 generated by the imaging system 110, according to one embodiment. FIG. 2B is a block diagram that illustrates scan elements or pixels 214 in a 2D scan, such as the cross-sectional scan 200 of FIG. 2A, according to one embodiment. The two dimensions of the scan 200 are represented by the x direction arrow 210 and the y direction arrow 212. The scan 200 consists of a two dimensional array of 2D scan elements (pixels) 214 each with an associated position. Typically, a 2D scan element is given by a row number, each row made up of pixels aligned in the x direction and a column number, each column made up of pixels aligned in the y direction, thus producing a rectangular array of scan elements. A value at each scan element position represents a measured or computed intensity or amplitude that represents a physical property (e.g. X-ray absorption or resonance frequency of an MRI scanner) at a corresponding position in the imaging area 124 of the subject 190. The measured property is called amplitude hereinafter and is treated as a scalar quantity. In some embodiment, multiple measured quantities are procured by the imaging system, such as an MRI spectrum, and the amplitude refers to some scalar combination of one or more of such multiple quantities.

The cross-sectional scan 200 includes a region of interest (ROI) 202 corresponding to the region of interest 126 within the subject 190 and covering a first subset of pixels 214 within the scan 200, e.g., a region that includes a lesion or tumor cells indicated by the dark area inside the ROI 202. The scan 200 also includes a region of low signal that is used as a region of noise (RON) 204 that does not overlap with the region of interest 202 and covers a second subset of pixels 214 within the scan 200. In some embodiments, the region of interest 202 is manually selected by a user based on a spatial relationship between the region of interest 202 and a landmark 203, such as a bone or other recognized anatomical feature. Similarly, in some embodiments, the region of noise 204 is manually selected by the user as a non-overlapping region outside the region of interest 202, which has a low signal or low dynamic range in the scan 200. In other embodiments, one or both of the ROI and the RON are selected automatically using a process described in more detail in a later section. In an example embodiment, the landmark 203 is a bone or organ within the subject 190. In some embodiments, the landmark 203 is a lesion or tumor and the region of interest 202 encompasses the landmark 203. In an embodiment, the region of interest 202 is automatically determined by the controller 120, based on the landmark 203; and, the region of noise 204 is automatically determined by the controller 120 based on an amplitude over the region of noise 204 being less than a low signal threshold. In various embodiments, the region of interest 202 and region of noise 204 are selected to cover an equal number of pixels 214 in the x direction 210 and the y direction 212 within the scan 200, or an unequal number of pixels in the x and y direction, or the size of the ROI 202 and the size of the region of noise 204 are different. For example, in some embodiments, the region of interest 202 is small, just large enough to cover a small nodule or tumor, but the region of noise 204 is larger, such as a large homogeneous section of the lung or liver.

The image in the region of interest 202 encompassing the first subset of pixels 214 can be deconstructed as a plurality of sampling blocks of a first size that are contiguous or non-contiguous or overlapping. A plurality of basis functions can be defined that span the uniform size of all sampling block and efficiently represent each sampling block with a few basis functions, called a sparse set representation. Many approaches to forming such basis functions are known, such as orthogonal basis function that are not linear combinations of each other, including Fourier components, wavelets, e.g., based on discrete Cosine transforms (DCTs), and empirical orthogonal functions (EOF). Other basis functions can also be used, such as sparse and redundant basis functions determined according to the procedures described in Elad et al., 2006. The set of weights for the plurality of basis functions used to reconstruct each sampling block in the region of interest 202 is determined, using known mathematical operations. The values for a particular basis function across all the pixels in a block can be displayed as a greyscale that is black for a pixel corresponding to a minimum value (e.g., −1.0) and white for a pixel corresponding to a maximum value (e.g., +1.0). The set of values for all the pixels in a block for one basis function is called an atom.

Figure 2C:
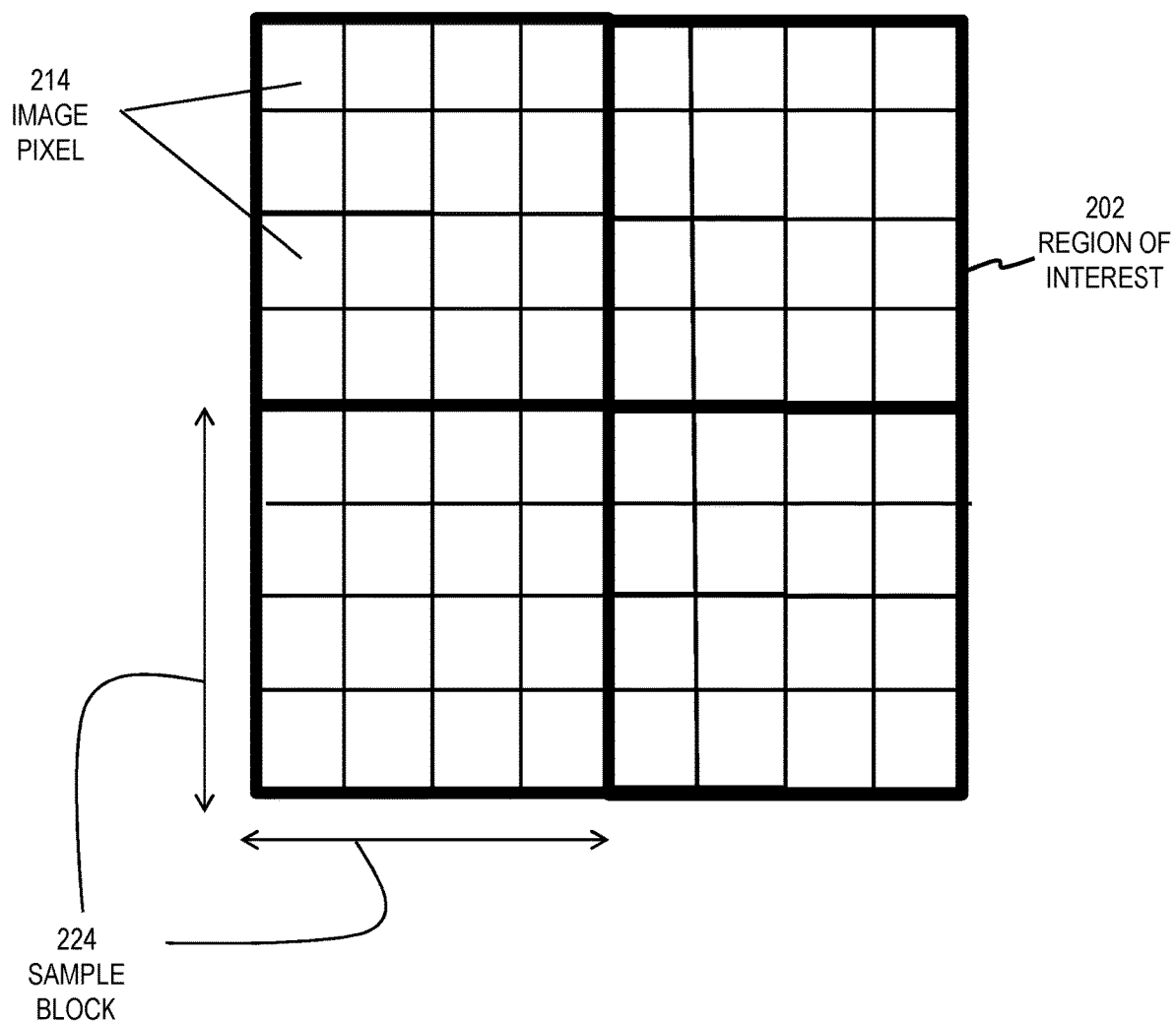
FIG. 2C is a block diagram that illustrates an example of image pixels and sample blocks in a region of interest of the cross-sectional scan of FIG. 2A, according to one embodiment.

FIG. 2C is a block diagram that illustrates an example of image pixels 214 and sample blocks 224 in the region of interest 202, according to one embodiment. Although only four contiguous and non-overlapping square sample blocks 224 of 4 pixels by 4 pixels are shown in FIG. 2C, in other embodiments, there are many more sample blocks, from tens to tens of thousands, of fewer or more pixels each (e.g., 2 pixels by 2 pixels or 9 pixels by 9 pixels or larger), or non-square sample blocks, or overlapping or non-contiguous sample blocks selected in the region of interest. In a preferred embodiment, each sample block 224 in the region of interest 202 is of equal size and shape. Similarly the region of noise 204 is also broken up into a plurality of sample blocks 224 that are of the same size and shape as those in the region of interest 202. If the regions (i.e., the ROI and the RON) are of different sizes, there will be more sample blocks in the larger region.

Figure 3A:
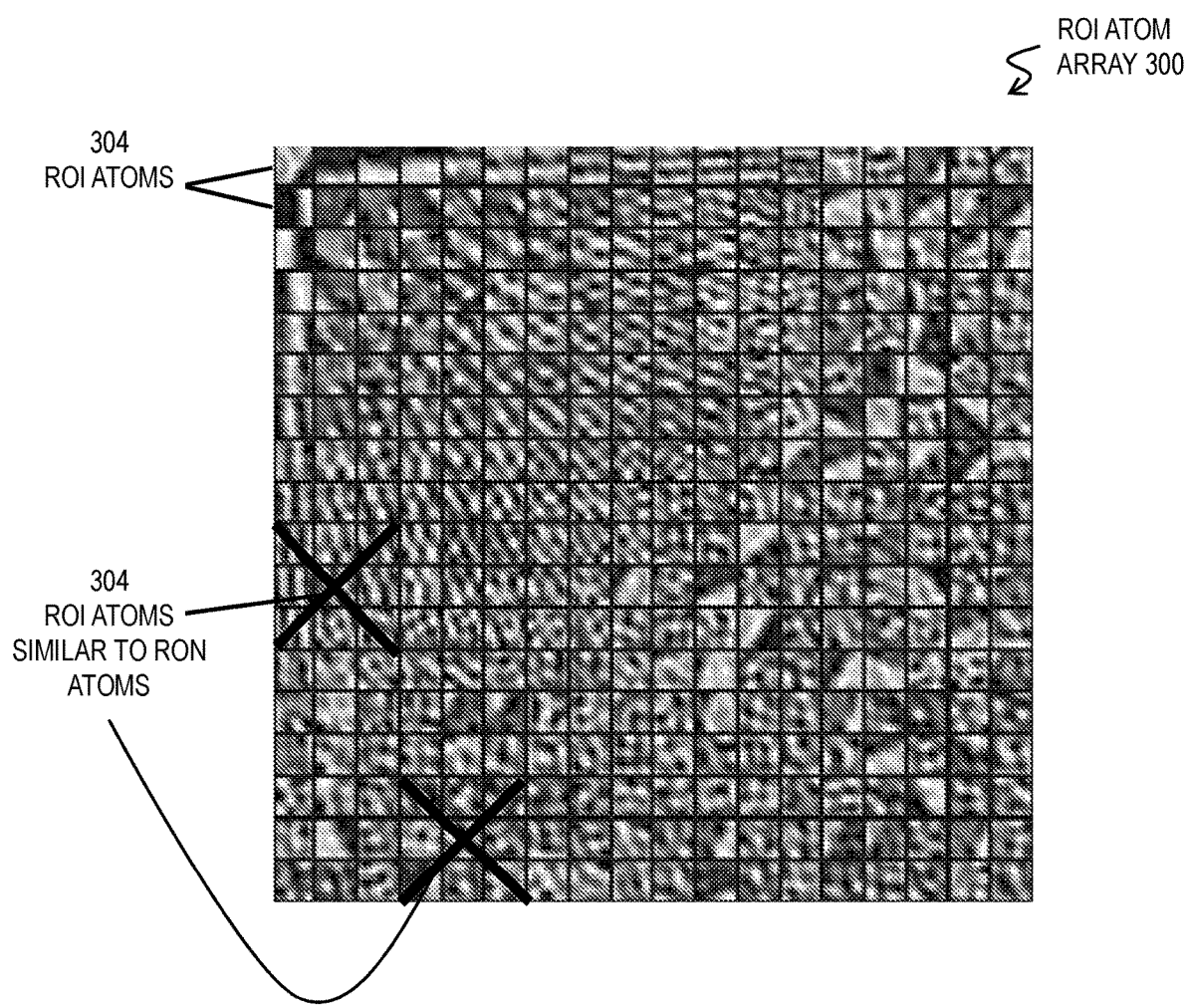
FIG. 3A is an image that illustrates an example of an atom array for multiple basis functions in a region of interest of the cross-sectional scan of FIG. 2A, according to one embodiment.

FIG. 3A is an image that illustrates an example array 300 of atoms 304 representing multiple basis functions in the region of interest 202 of the cross-sectional scan 200 of FIG. 2A, according to one embodiment. Each atom 304 of the atom array 300 depicts a corresponding basis function over the size and shape of the sample block 224 in the region of interest 202. In one embodiment, in the depicted image each atom 304 spans a 9 pixel by 9 pixel sample block and thus has 81 pixels. In each atom 304, black represents a minimum value (e.g., −1.0) and white represents a maximum value (e.g., 1.0). In the depicted image there are 256 atoms representing 256 sparse and redundant basis functions in the region of interest 202. This set of 256 atoms is called the dictionary for the region of interest 202. The atoms 304 are arranged in a square for convenience of display. In one embodiment, the atoms 304 are sparse in that they are defined so that only a few (on the order of 1 to 5) are used to reconstruct any sample block 224, and they are redundant because some of them are linear combinations of the others. The method to compute these and the advantages for doing so this way are described in Elad et al., 2006, previously cited.

Figure 3B:
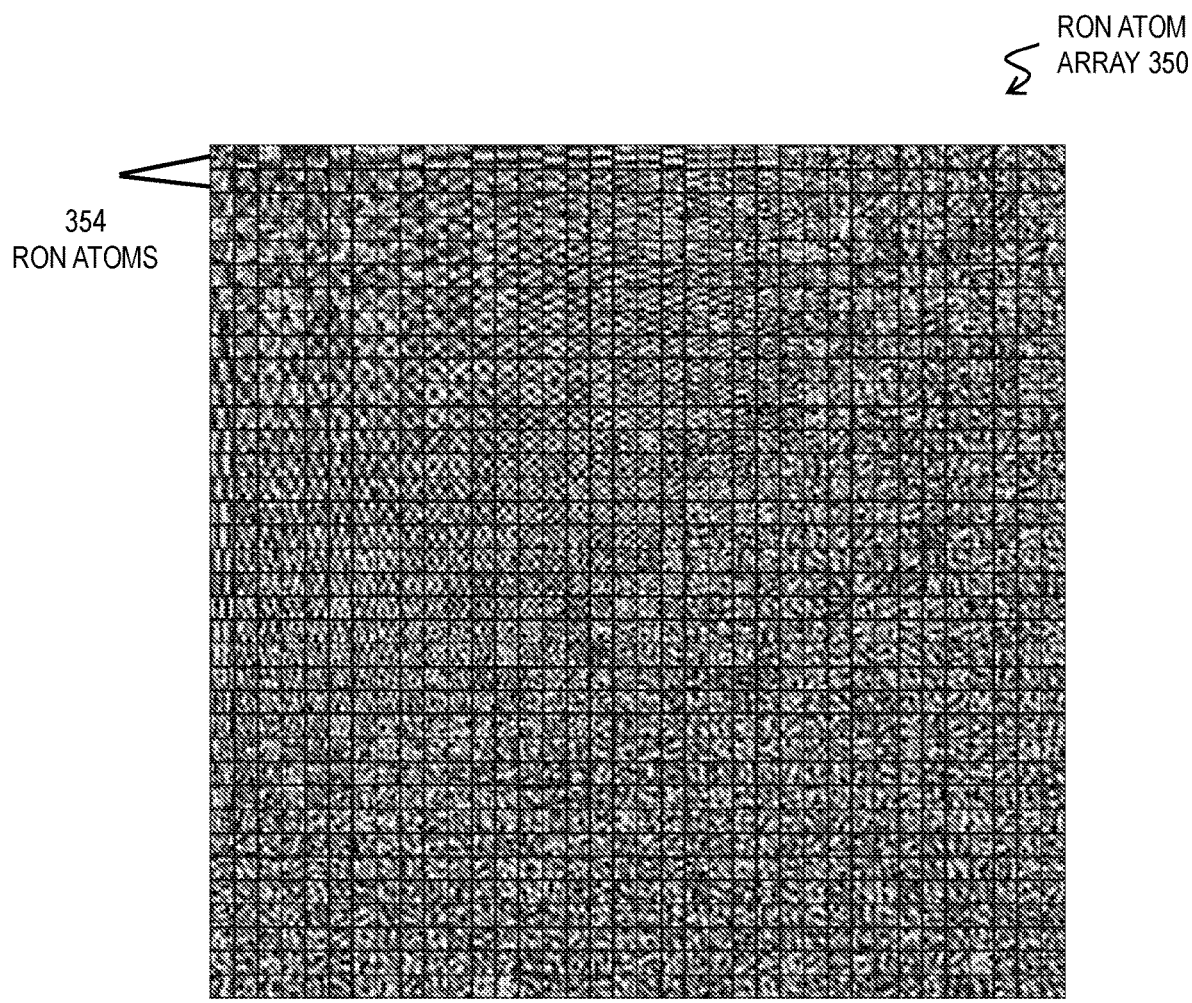
FIG. 3B is an image that illustrates an example of a larger atom array for multiple basis functions in a region of noise of the cross-sectional scan of FIG. 2A, according to one embodiment.

FIG. 3B is an image that illustrates an example of an array 350 of atoms 354 for multiple basis functions in the region of noise 204 of the cross-sectional scan 200 of FIG. 2A, according to one embodiment. Each atom 354 of the atom array 350 depicts a corresponding basis function over the size and shape of the sample block 224 in the region of noise 204. In one embodiment, in the depicted image each atom 354 spans a 9 pixel by 9 pixel sample block and thus has 81 pixels and is the same size as the atoms 304 in the region of interest, described above. As in FIG. 3A, in each atom 354, black represents a minimum value (e.g., −1.0) and white represents a maximum value (e.g., 1.0). In the depicted image there are 1024 atoms representing 1024 sparse and redundant basis functions in the region of noise 204, as before, arranged in a square for convenience of display. This set of 1024 atoms is called the dictionary for the region of noise 204. Because the area of the array 350 is larger and the patterns are more varied, there are more basis functions involved to offer the advantages of sparse reconstruction.

After the ROI atom array 300 and the RON atom array 350 are determined for the basis functions, each atom 304 in the region of interest is compared to each atom 354 in the region of noise and a measure of similarity is computed. Any measure of similarity may be used in various embodiments, including cross correlation, sum of differences, sum of differences squared, and mutual information. If the measure of similarity is above a predetermined threshold (e.g., a threshold close to zero for mutual information, such as in a range from about 0.00 to about 0.01), the atom 304 is considered to represent noise and the atom 304 is removed from the array 300 of atoms for the region of interest 202. FIG. 3A depicts 18 ROI atoms 304 where it is assumed, for purposes of illustration, the measure of similarity is above the predetermined threshold and thus the corresponding basis functions are considered to represent noise and are removed from the array 300. As a result, the basis functions corresponding to the removed atoms 304 will not have an amplitude contribution to any sample block 224 in a reconstructed image of the region of interest 202 of the scan 200.

Figure 4A:
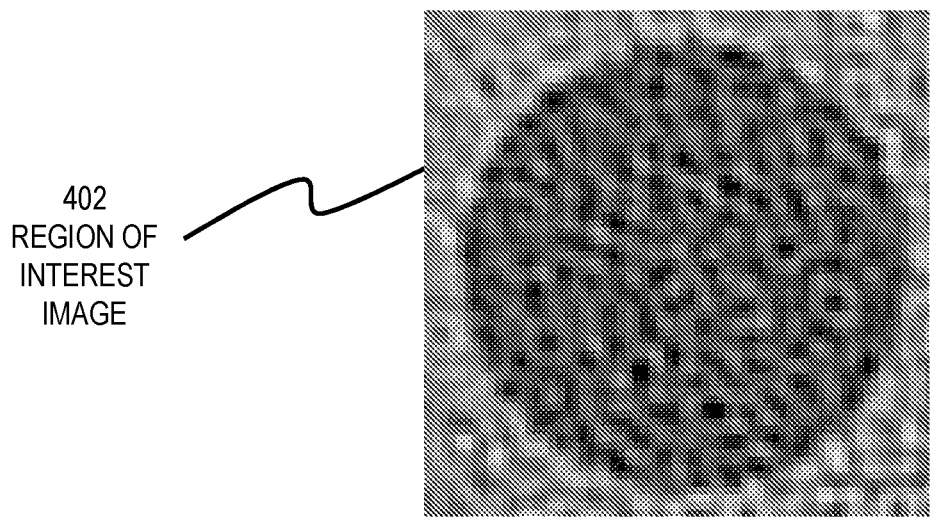
FIG. 4A is an image that illustrates an example of a 2D ROI image in the cross-sectional scan of FIG. 2A, according to one embodiment.
Figure 4B:
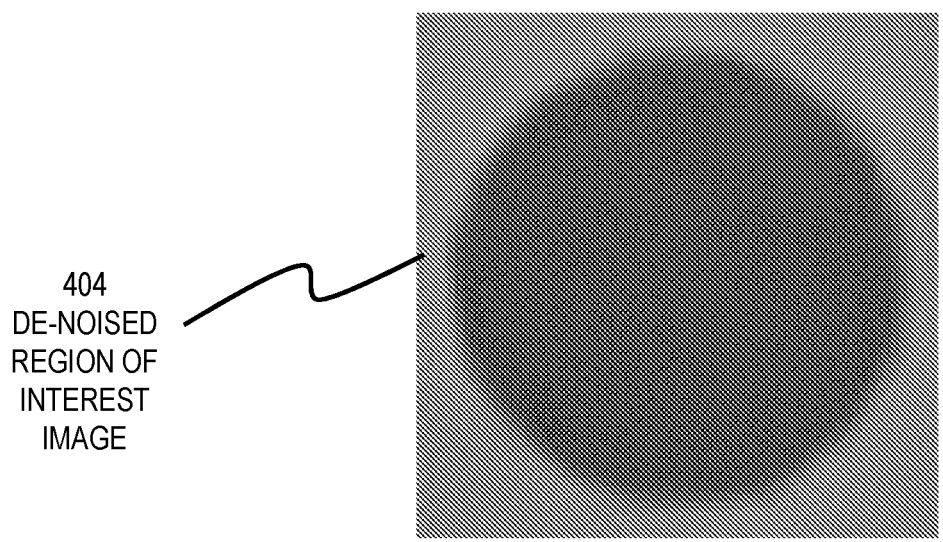
FIG. 4B is an image that illustrates an example of a de-noised 2D ROI image in the cross-sectional scan of FIG. 2A, according to one embodiment.

FIG. 4A is an image that illustrates an example of a 2D ROI image 402 in the cross-sectional scan 200 of FIG. 2A, according to one embodiment. The 2D ROI image 402 depicts the region of interest 202 prior to reconstruction. FIG. 4B is an image that illustrates an example of a de-noised 2D ROI image 404 in the cross-sectional scan 200 of FIG. 2A, according to one embodiment. The de-noised 2D ROI image is reconstructed, using the atoms in the atom array 300 with the atoms 304 removed. In one embodiment, the atoms in the atom array 300 with the atoms 304 removed, are used to reconstruct each sample block 224 of the reconstructed image 404 of the region of interest 202. In one embodiment, the atoms in the atom array 300 with the atoms 304 removed are sparse in that only a few (on the order of 1 to 5) of the atoms are used to reconstruct each sample block 224 of the reconstructed image 404 of the region of interest 202. This reconstruction is performed using known mathematical operations and the atom array 300 sans atoms 304. The algorithm to determine which atoms are used is called orthogonal matching pursuit algorithm, which is described in more detail below with reference to Equation 5, in which item $a_{i,j}$ determines what atoms are used. The de-noised cross-sectional image 404 excludes the image noise introduced into the imaging data by the image acquisition settings of the imaging system 110. The de-noised cross-sectional image 404 of the region of interest 202 is then output to the display device 130 or used in subsequent processing, such as determining nodule/tumor size, or changes relative to some earlier or later scan, and the result of the subsequent processing is presented on the display device 130 as output.

This process provides the advantage of de-noising a single cross section image from a scanning imager, such as CT or MRI scanners. It takes advantage of knowledge that certain areas in a medical image of a patient or other subject, such as areas inside the lung, are dominated by noise, while other areas, near the surface, spine and in the vicinity of lung nodules have substantial signal. The resulting de-noised images of the region of interest can be compared among images collected from different imagers or from the same imager with different settings or both, which ordinarily cannot be easily compared.

FIG. 5 is a flow diagram that illustrates an example of a method 500 to perform local de-noising of an image, according to one embodiment. Although steps are depicted in FIG. 5, and in subsequent flowcharts FIG. 6 and FIG. 8, as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

In step 502, the cross-sectional scan 200 is automatically obtained by the controller 120. In one embodiment, the controller 120 receives the cross-sectional scan 200 from the imaging system 110. In another embodiment, the controller 120 operates the imaging system, and receives imaging data from the imaging system 110 to form the cross-sectional scan 200.

In step 504, the first subset of pixels 214 in the region of interest 202 and the second subset of pixels 214 in the non-overlapping region of noise 204 are obtained by the controller 120. In some embodiments, an operator manually selects the region of interest or the region of noise or both. In an example embodiment, the operator manually forms a sampling mask around a portion of the region of interest 202 that corresponds to the first subset of pixels 214 and manually forms a sampling mask around a portion of the region of noise 204 that corresponds to the second subset of pixels 214. In some embodiments, the controller 120 automatically determines the first subset of pixels 214 in the region of interest 202, e.g., based on automatic recognition of the landmark 203 spatially related to the region of interest 202 or based on other methods described below. In some embodiment, the controller 120 automatically determines the second subset of pixels 214 in the region of noise 204, e.g., based on the amplitude within the region of noise 204 being less than a low signal threshold or based on a landmark spatially related to the region of noise or some combination or based on other methods described below.

In step 506, the sampled blocks 224 and the array 300 of atoms representing multiple basis functions is determined by the de-noising module 122 for the region of interest 202.

In step 508, the sample blocks 224 and the array 350 of atoms representing multiple basis functions is determined by the de-noising module 122 for the region of noise 204.

In step 510, a value for a measure of similarity is determined by the de-noising module 122 for the atoms in the atom array 300 with the atoms in the atom array 350. The de-noising module 122 computes a value for the measure of similarity for each atom in the atom array 300, by comparing each atom 304 in the atom array 300 with each atom 354 in the atom array 350.

In step 512, atoms 304 for the ROI 202 are removed if the measure of similarity determined in step 510 is above a predetermined threshold value, such that all the atoms 304 considered to be dominated by noise are removed and thus do not contribute to sample blocks 224 of the reconstructed image (e.g., image 404) of the region of interest 202.

In step 514, the de-noised cross-sectional image 404 of the region of interest 202 is reconstructed by the de-noising module 122 using each atom of the atom array 300, excluding the atoms removed during step 512. In step 516, the de-noised cross-sectional image 404, or a result based on it, such as tumor size and shape, is presented on the display device 130.

The method 500 is based on the framework of sparse representation using dictionary learning. Sparse representation aims to solve the problem of coding an image as a linear combination of only a few small image patches (atoms). Dictionary learning aims to generate an over-complete dictionary containing representative atoms which are the best for sparse representation for each of several different blocks that are portions of the image region. The basic idea of this method is to learn target object dictionary from ROI and noise dictionary from region of noise (RON) respectively; and then, do sparse representation on ROI and suppress noise-like atoms. The suppression of noise-like atoms is fulfilled by comparing atoms in the ROI dictionary, atoms in the RON dictionary and image patches of ROI itself. Since ROI and RON are regions from the same medical image, the de-noising on ROI can be achieved adaptively based on the noise pattern learned from the same medical image.

2. EXAMPLE EMBODIMENTS

In an example embodiment, the method 500 is performed with simulated data and discrete Cosine transform (DCT) stationary wavelets are used as pre-processing orthogonal basis functions in the method before deriving a ROI sparse and redundant dictionary (atom array), as described in Elad et al., 2006 cited above. The same method is used to derive a RON sparse and redundant dictionary (atom array). Other embodiments and advantages are described in subsequent sections using real lung images and more fully automated processing.

2.1 Simulated DCT Embodiment.

Figure 6:
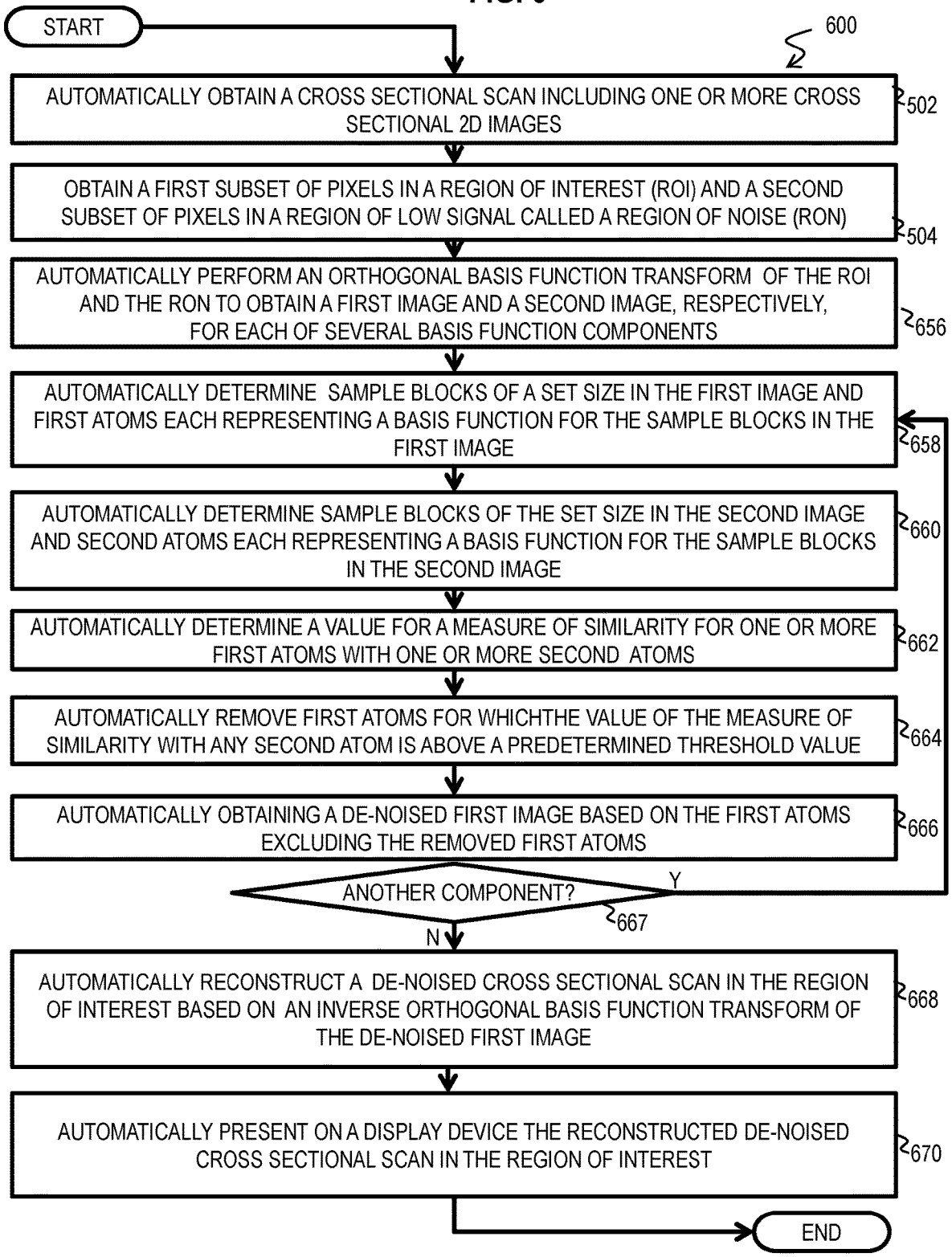
FIG. 6 is a flow diagram that illustrates an example method to perform local de-noising an image based on orthogonal basis function transforms of original image, according to one embodiment.

This embodiment transforms the original image using stationary wavelet transforms, and determines atoms separately for each spatial transform component. In an example embodiment, instead of determining the sample blocks 224 and atom arrays 300, 350 of the region of interest 202 and region of noise 204 directly on a source image, as in steps 506 and 508 of FIG. 5, the sample blocks and atom arrays are determined of a respective first and second image based on the region of interest 202 and region of noise 204. In this example embodiment, the first image is one component of an orthogonal basis function transform of the region of interest 202 and the second image is the same component of the orthogonal basis function transform of the region of noise 204. FIG. 6 is a flow diagram that illustrates an example method 650 to perform local de-noising an image based on orthogonal basis function transforms of original image, according to the example embodiment. Steps 502 and 504 are the same as in the method 500 previously discussed.

In step 656, an orthogonal basis function transform is performed of the region of interest 202 to obtain one or more components to each serve as the first image and the same orthogonal basis function transform is performed of the region of noise 204 to obtain one or more corresponding components to each serve as the second image. The result of each transform is one or more basis function components. In various embodiments one or more of these components are subjected to the determination of blocks and atoms in both the component for the ROI (first image) and the component for the RON (second image). FIG. 2H is a set of images that illustrate an example of a discrete stationary wavelet transform (SWT) 290 of the region of interest 202 of the cross-sectional scan 200 of FIG. 2A over the directions horizontal (h), vertical (v) and diagonal (d) of FIG. 2G, according to an embodiment, leading to one low frequency (designated L or by lower case a) and three high frequency components corresponding to the directions h, v and d at a first level transform. The low frequency component (a) is further transformed to a second level transform leading to four more components, one low frequency (designated aa) and three high frequency components corresponding to the directions h, v and d designated ah, av, ad, respectively, at a second level transform.

In the illustrated embodiment, the SWT 290 decomposes the region of interest 202 into sub-band images including a low frequency sub-band image 291, a first high frequency sub-band image 292, a second high frequency sub-band image 293 and a third high frequency sub-band image 294. In an example embodiment, the high frequency sub-band images are based on a decomposition of the region of interest 202 into respective directions. FIG. 2G is a block diagram that illustrates an example of a plurality of directions 280 of the SWT 290 of FIG. 2H, according to an embodiment. The high frequency sub-band images of the SWT 290 are associated with a different direction 280. The first high frequency sub-band image 292 is a horizontal decomposition associated with a horizontal direction 282, the second high frequency sub-band image 293 is a vertical decomposition associated with a vertical direction 284 and the third high frequency sub-band image 294 is a diagonal decomposition associated with diagonal directions 286, 288. In an example embodiment, the diagonal directions 286, 288 are offset approximately 45 degrees from the horizontal and vertical directions 282, 284. In other embodiments, the plurality of directions 280 are not limited to the directions 282, 284, 286, 288.

Figure 2D:
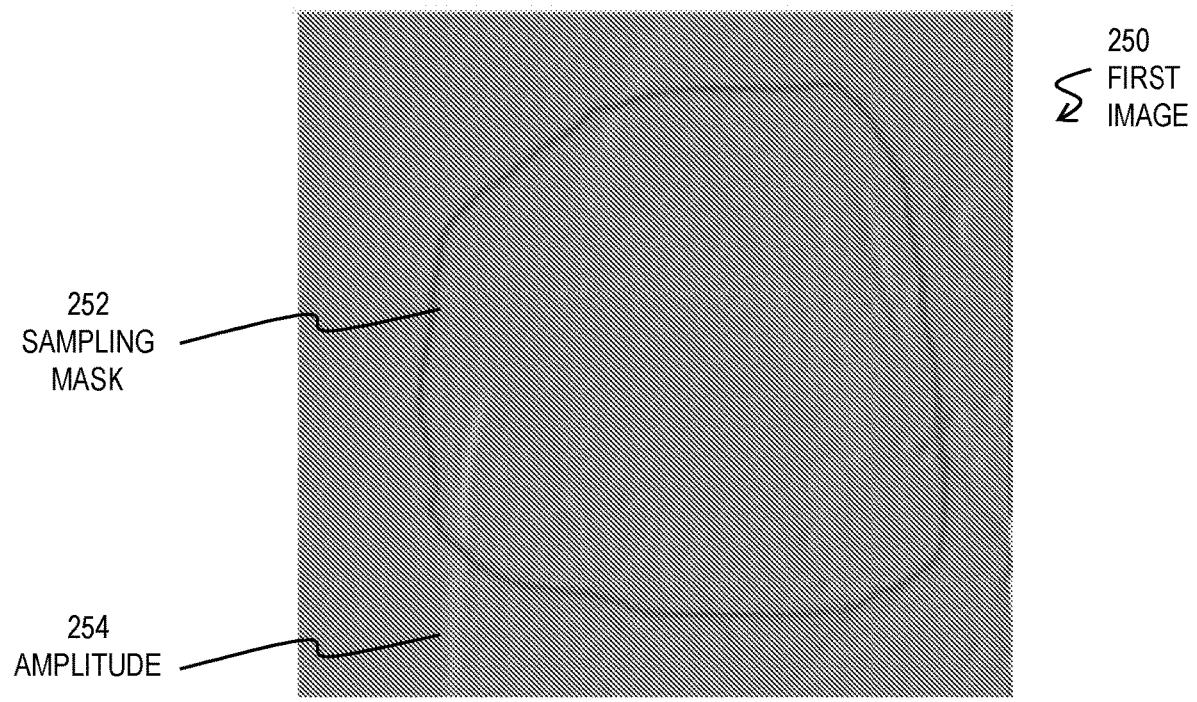
FIG. 2D is an image that illustrates an example of an orthogonal basis function transform of a region of interest of the cross-sectional scan of FIG. 2A for a first basis function, according to an embodiment.
Figure 2E:
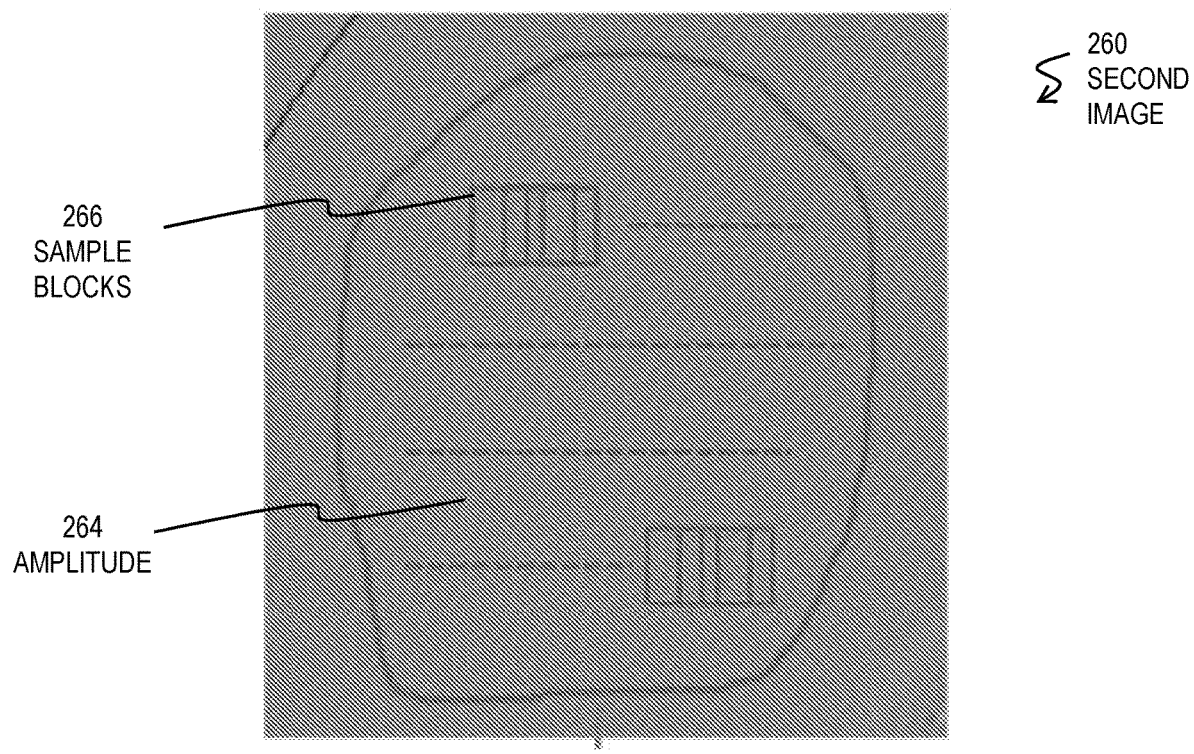
FIG. 2E is an image that illustrates an example of an orthogonal basis function transform of a region of noise of the cross-sectional scan of FIG. 2A for the first basis function, according to an embodiment.
Figure 2F:
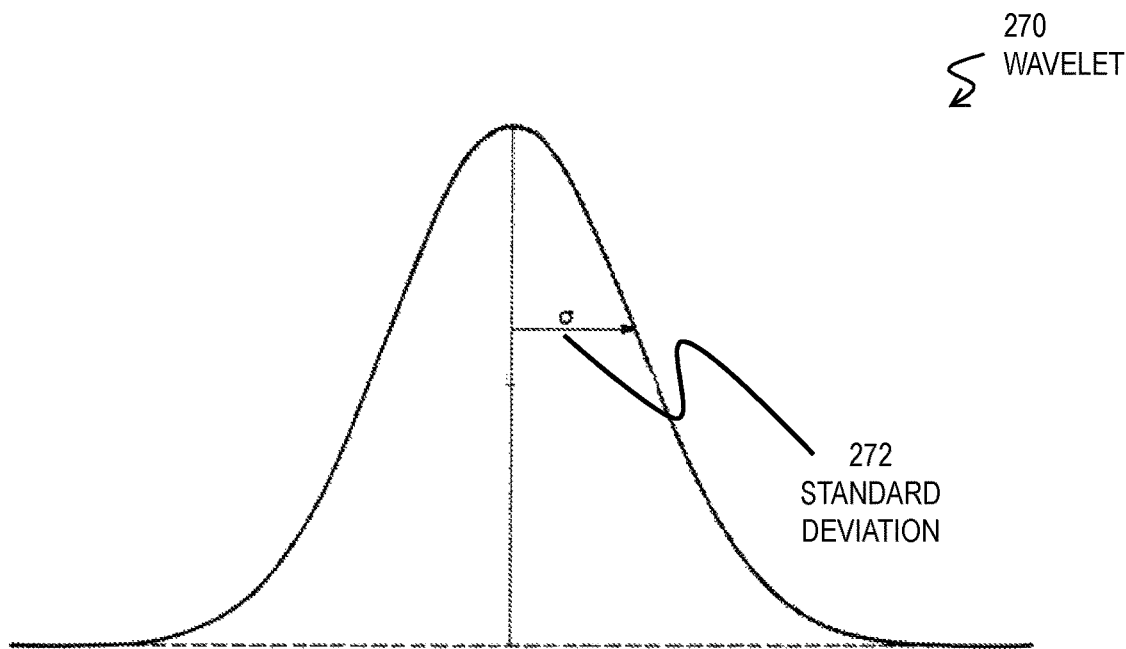
FIG. 2F is a block diagram that illustrates an example of a wavelet that is used to perform the SWT of FIG. 2H, according to an embodiment.
Figure 2G:
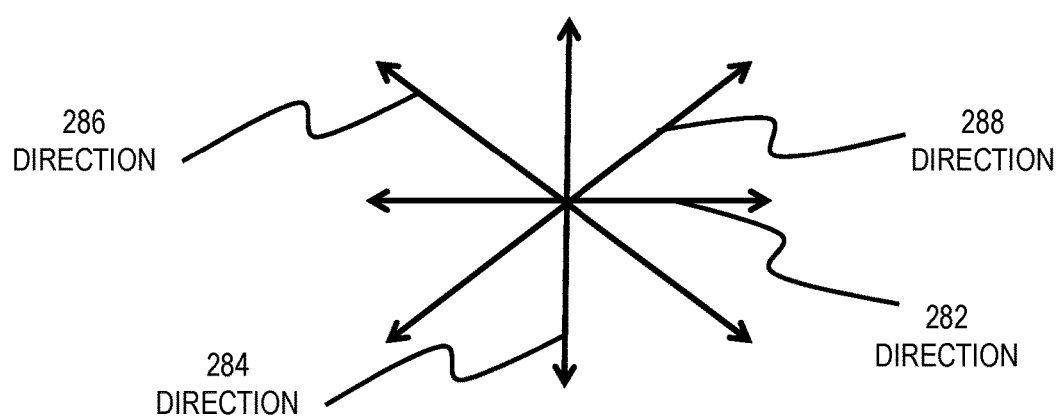
FIG. 2G is a block diagram that illustrates an example of a plurality of directions of the SWT of FIG. 2H, according to an embodiment.
Figure 2H:
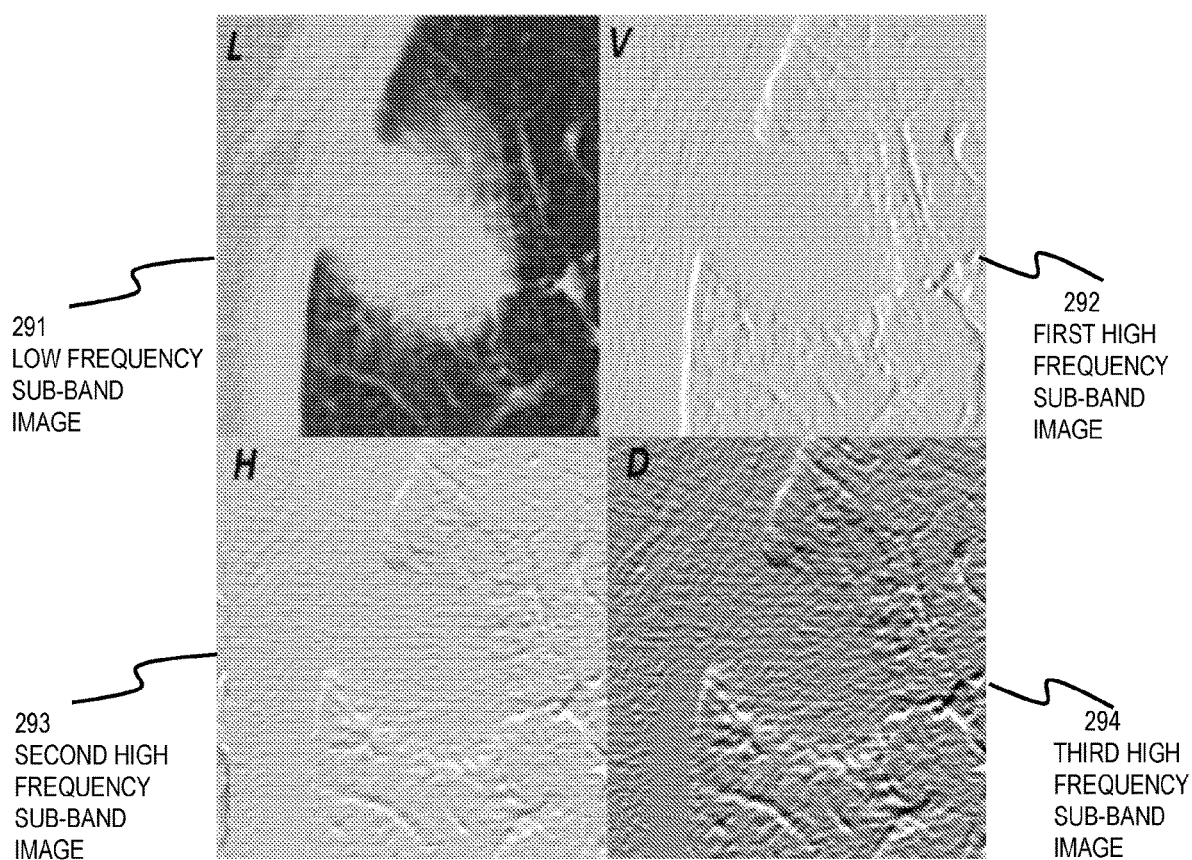
FIG. 2H is a set of images that illustrate an example of a stationary wavelet transform (SWT) of the region of interest of the cross-sectional scan of FIG. 2A over the directions of FIG. 2G, according to an embodiment.

FIG. 2D is a first image 250 that illustrates an example of an orthogonal basis function transform of the region of interest 202 of the cross-sectional scan 200 of FIG. 2A for a first component, according to an embodiment. In an example embodiment, the first image 250 is one of the high frequency sub-band images 292, 293, 294 resulting from the SWT 290. FIG. 2E is a second image 260 that illustrates an example of an orthogonal basis function transform of the region of noise 204 of the cross-sectional scan 200 of FIG. 2A for the first component, according to an embodiment. In an example embodiment, the second image 260 is one of the high frequency sub-band images resulting from a SWT of the region of noise 204, that corresponds to the same component of the SWT 290 of the region of interest 202 of FIG. 2H. In an example embodiment, the orthogonal basis transform is a discrete stationary wavelet transform. FIG. 2F is a block diagram that illustrates an example of a wavelet 270 that is used to perform the SWT 290 of FIG. 2H, according to an embodiment. In an example embodiment, the wavelet 270 is used to generate a wavelet filter selected from a group comprising a Haar wavelet filter, a Daubechies wavelet filter, and a Coiflets wavelet filter, where the wavelet filter is used to perform the SWT.

In an example embodiment, in FIG. 2D, amplitudes 254 of the first image 250 for the first, component are represented in greyscale, where dark grey corresponds to a large amplitude, light grey corresponds to a small amplitude and an edge between a dark and light colored grey corresponds to large change in amplitude. Using the SWT 290, similar first images are obtained for each of the other high frequency components, e.g., associated with directions 282, 284, 286/288. Similarly, based on a SWT of the region of noise 204, a respective second image is obtained for each of the high frequency components, e.g., associated with the directions 282, 284, 286/288, where the second image is in the region of noise 204. FIG. 2D also depicts an optional sampling mask 252 that can be used to select less than all of the region of interest 202, for purposes of de-noising the portion of the region of interest 202 inside the sampling mask.

In step 658, sample blocks 266 and an array of atoms representing multiple basis functions of the first image is determined by the de-noising module 122 in a similar manner as the sample blocks 224 and the array 300 of atoms were determined of the region of interest 202 in step 506; but, in this embodiment for one of the basis function components at a time for at least one of the basis function components. In an example embodiment, where a plurality of first images 250 are obtained in step 656 for each direction of the SWT 290, step 658 is performed for each first image 250 to obtain respective sample blocks 266 and a respective atom array for each first image 250.

In step 660, sampled blocks 266 and an array of atoms representing multiple basis functions of the second image is determined by the de-noising module 122 in a similar manner as the sample blocks 224 and the array 350 of atoms were determined of the region of noise 204 in step 508. In an example embodiment, where a plurality of second images are obtained in step 656 for multiple components of the SWT of the region of noise 204, step 658 is performed for each second image to obtain respective sample blocks 266 and a respective atom array for each second image.

In step 662, a value for a measure of similarity is determined by the controller 120 for the atoms in the atom array of the first image with the atoms in the atom array for the second image, in a similar manner as in step 510. In an example embodiment, where a plurality of atom arrays are determined in step 658 and a plurality of atom arrays are determined in step 660, step 662 involves comparing atoms from an atom array of a first image for one of the components with atoms from an atom array of a second image for the corresponding component, where the first and second images were determined in step 656 using the same SWT direction.

In step 664, atoms for the atom array of the first image 250 are removed if the measure of similarity determined in step 662 is above a predetermined threshold value. Thus all the atoms considered to be dominated by noise are removed and thus do not contribute to sample blocks 266 of a reconstructed first image. In an example embodiment, where a plurality of atom arrays are determined in step 658, atoms are removed from each atom array if the measure of similarity determined in step 662 is above the predetermined threshold value.

In step 666, a de-noised first image is obtained on the controller 120 using each atom of the atom array of the first image for the current component, excluding the atoms removed during step 664. In an example embodiment, where a plurality of atom arrays are determined in step 658, the de-noised first image is obtained using each atom of the plurality of atom arrays, excluding the atoms removed during step 664. The result is the sparsely represented image.

In step 667, it is determined if there is another basis function component to compare in the ROI (first image) and RON (second image). If so control passes back to step 658 to determine the blocks and atoms for the ROI and RON of the next component. If not, control passes to step 668.

In step 668, the de-noised cross-sectional image 404 of the region of interest 202 is reconstructed by the de-noising module 122 using an inverse orthogonal basis function transform of the de-noised sparse first image obtained in step 666. In an example embodiment, the inverse orthogonal basis function transform is an inverse discrete stationary wavelet transform.

In step 670, the de-noised cross-sectional image 404, or a result based on it, such as tumor size and shape, is presented on the display device 130. In some embodiments, step 670 includes total variation de-noising, described in more detail below.

FIG. 2I is a set of images that illustrate an example of a level-2 SWT 295 of the low frequency sub-band image 291 of the SWT 290 of FIG. 2H over the directions of FIG. 2G, according to an embodiment. In an example embodiment, the level-2 SWT 295 is performed on the low frequency sub-band image 291, which generates four level-2 sub-band images including a level-2 low frequency sub-band image 296, a level-2 first high frequency sub-band image 297, a level-2 second high frequency sub-band image 298 and a level-2 third high frequency sub-band image 299. A similar level-2 SWT is performed on the low frequency sub-band image of the SWT of the region of noise 204. In an example embodiment, steps 656-568 are repeated for one or more level-2 high frequency sub-band images 297, 298, 299, as well as one or more corresponding level-2 high frequency sub-band images of the SWT of the region of noise 204.

Figure 7:
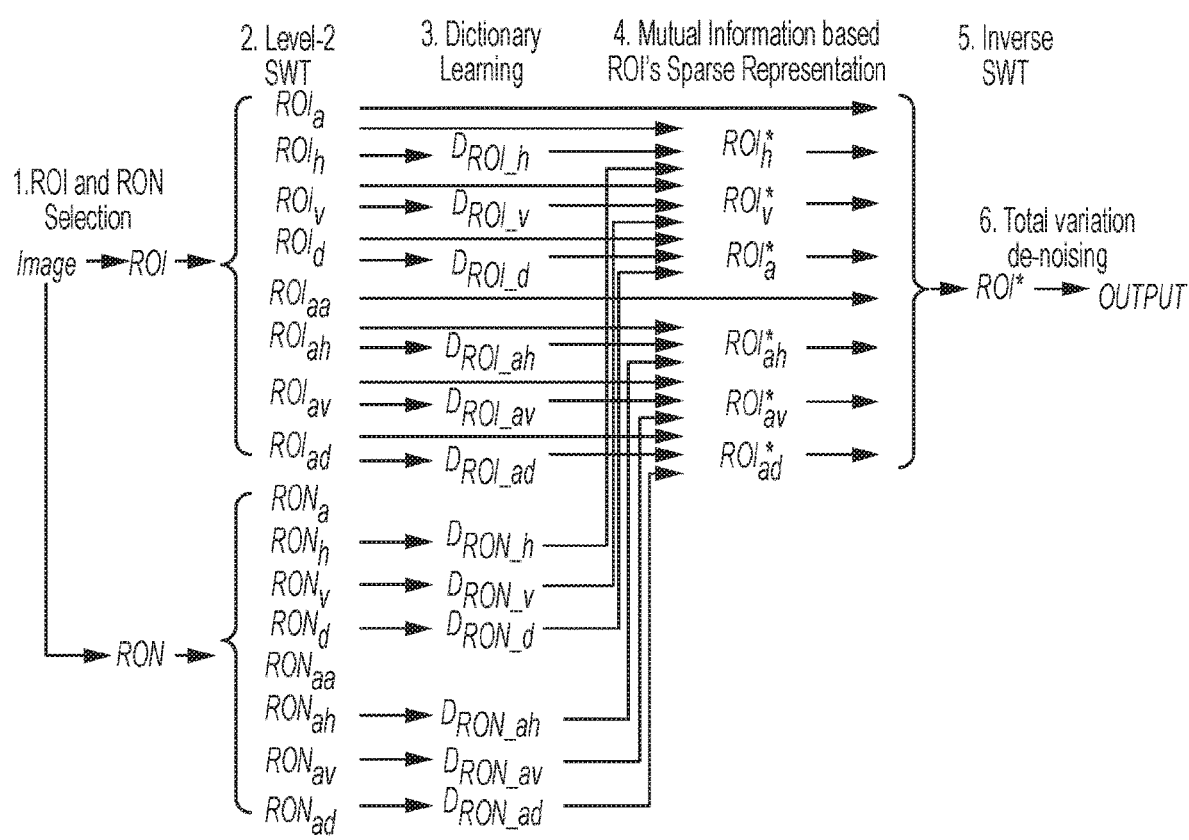
FIG. 7 is a block diagram that illustrates an example data flow to perform local de-noising an image based on a 2 level stationary wavelet transforms of the original image, according to one embodiment.

FIG. 7 is a block diagram that illustrates an example data flow to perform local de-noising an image based on a 2 level stationary wavelet transforms of the original image, according to one embodiment. From the image is derived an ROI and a RON in step 504. For each a level-2 discrete stationary wavelet transform (SWT) is conducted in step 656 to produce 8 transformed images, called sub-band images (as the orthogonal basis function components), indicated by subscripts a (low frequency), h (horizontal), v (vertical), d (diagonal), aa (low frequency of low frequency sub-band), ah (horizontal of low frequency sub-band), av (vertical of low frequency sub-band), and ad (diagonal of low frequency sub-band). In steps 658 and 660, for one of the high frequency sub-bands with subscripts that include h (horizontal), v (vertical) and d (diagonal), the dictionary is learned to produce one to five atoms per block of 9×9 pixels, those dictionaries are designated by the symbol D with a first subscript for the ROI or RON and a second subscript indicating the first level high frequency sub-bands, h, v, d or the second level high frequency sub-bands ah, av, and ad. In steps 662 and 664, the atoms of the ROI dictionaries that are similar by mutual information to the atoms of the RON are removed. In step 666, the region of interest for the current high frequency sub-band is reconstructed with the remaining atoms of the ROI dictionaries to produce the filtered high frequency sub-band for the region of interest, indicated by ROI* with subscripts h, v, d, ah, av, ad. The steps 662, 664 and 666 are repeated for the other high frequency sub-bands. In step 668, the inverse SWT operates on the ROIa, ROIaa and the filtered high frequency sub-bands ROI* to produce the de-noised region of interest ROI*, which is output in step 670. In some embodiments, step 670 includes total variation de-noising.

Example equations for implementing the steps depicted in FIG. 7 are provided here. The aim of dictionary learning is to generate a book with which an image can be coded efficiently as a linear combination of only a few patches (atoms). The dictionary learning process refers to the solution of the following minimization problem, using Expression 1.

$$\min_{X,D,A} \{\lambda \|X - Y\|_2^2 + \Sigma_{ij}\|a_{ij}\|_0 + \Sigma_{ij}\|R_{ij}X - Da_{ij}\|_2^2\} \quad (1)$$

Where X is the output image block and Y is the given image block. X and Y are of same size. The subscript ij denotes pixel indices in processed image block (e.g., i ∈ 1, ..., 9 and j ∈ 1, ..., 9 in the sample embodiments). $R_{ij}$ represents the extraction of patch $R_{ij}X$ at the position (i,j) in the image X. D represents the learned n×K dictionary, where n is the size of $\sqrt{n}\times\sqrt{n}$ patch (e.g., n=81), and K is the pre-defined number of atoms (e.g., about 5). The symbol a denotes the coefficient set $\{a_{ij}\}$ for coding the image X based on D.

Then, the two dictionaries learned from ROI and RON are given by Equation 2 and Equation 3, respectively.

$$D_{ROI} = \{w_{ROI}(m)|m \in 1,2,\ldots K\} \quad (2)$$

$$D_{RON} = \{w_{RON}(m)|m \in 1,2,\ldots K\} \quad (3)$$

Where w denotes atoms (also called small image patches of size $\sqrt{n}\times\sqrt{n}$). A variety of existing dictionary learning algorithm could be applied to solve Expression 1 and attain $D_{ROI}$ and $D_{RON}$. For instance, in the current implementation, the K-SVD algorithm was adopted to solve Expression 1.

The process of sparse representation is patch-based. At every position (i,j), sparse coding involves solving of the Equation 4.

$$\min_a \|a_{ij}\|_0 \text{ s.t. } \|R_{ij}Y_{ROI} - D_{ROI}a_{ij}\|_2^2 \leq \sigma \quad (4)$$

Where $R_{ij}Y_{ROI}$ represent the extraction of image patch at the position (i,j), and $a_{ij}$ represents the set of weights for ROI atoms. The parameter a is the standard deviation computed from RON, which limits the degree of minimization to achieve. For an input image $Y_{ROI}$, the solution of Equation 4 can be attained using orthogonal matching pursuit algorithm, given by Equation 5.

$$X_{ROI} = (\lambda I + E_{ij}R_{ij}^T R_{ij})^{-1}(\lambda Y_{ROI} + \Sigma_{ij}R_{ij}^T D_{ROI}a_{ij}) \quad (5)$$

Where I is the unit matrix. For the purpose of noise suppression, the aim is to suppress the weights of the noise-like $w_{ROI,ij}$ in the Equation 5.

In step 510 or step 662, a measure of similarity is determined so that atoms similar to noise atoms can be removed from the sparse reconstruction in the ROI. In an example embodiment, the measure of similarity is mutual information (MI). The MI between two atoms of $w_1$ and $w_2$ is defined as, $$MI(w_1, w_2) = \sum_{a=0}^{L-1}\sum_{b=0}^{L-1} p(w_1, w_2)\log\frac{p(w_1, w_2)}{p(w_1)\cdot p(w_2)} \quad (6)$$

Where L is the gray levels of $w_1$ and $w_2$. $p(w_1)$ is the gray-level probability of atom $w_1$. $p(w_2)$ is the gray-level probability of atom $w_2$. $p(w_1,w_2)$ is the joint probability of atoms $w_1$ and $w_2$.

For every $w_{ROI,ij}$ (l) at the position (i,j), the noise-likeness (NL) is defined by Equation 7a, $$NL(w_{ROI,ij}(l)) = \max_{w_{RON}(m) \in D_{RON}}[MI(w_{ROI,ij}(l)), w_{RON}(m))] - MI(w_{ROI,ij}(l))R_{ij}Y_{ROI}), l \in 1,2,\ldots,K \quad (7a)$$

Where $D_{RON}$ and $w_{RON}$ are RON dictionary and RON atoms, as defined in Equation 3. K is the total number of atoms. In Equation 7a, the first item is given by Expression 7b $$\max_{w_{RON}(m) \in D_{RON}}[MI(w_{ROI,ij}(l), w_{RON}(m))] \quad (7b)$$

And represents the likeness of ROI atom $w_{ROI,ij}(l)$ to the most similar RON atom in the $D_{RON}$, while the second item given by Expression 7c $$MI(w_{ROI,ij}(l), R_{ij}Y_{ROI}) \quad (7c)$$

represents the likeness of the ROI atom $w_{ROI,ij}$ (l) to the current image patch $R_{ij}Y_{ROI}$. Thus, to suppress noise components, the weight set $a_{ij}^*$ for $w_{ROI}$ could be set to as given by Equation 8.

$$a_{ij}^*(l) = \begin{cases} a_{ij}(l) \text{ s.t. } a_{ij}(l) \neq 0, & NL(w_{ROI,ij}(l)) < 0 \\ 0 & \text{otherwise} \end{cases} \quad (8)$$

Finally, Equation 5 is updated with the new weight set $a_{ij}^*$ to fulfill noise suppression, as shown in equation (9).

$$X_{ROI}^* = (\lambda I + \Sigma_{ij}R_{ij}^T R_{ij})^{-1}(\lambda Y_{ROI} + \Sigma_{ij}R_{ij}^T D_{ROI}a_{ij}^*) \quad (9)$$

In some embodiments, step 670 includes total variation de-noising. The total variation de-noising is applied to obtain the final de-noising ROI result in these embodiments. Total variation de-noising is an approach for noise reduction while preserving sharp edges. In contrast to conventional low-pass filter, total variation de-noising 'filter' is obtained by solving a particular optimization problem. The optimization problem in total variation de-noising is given by Equation 10.

$$\min_{x \in X, y \in Y} \frac{1}{2}\Sigma_{i,j}\|x-y\|^2 + \beta\nabla X \quad (10)$$

Where X and Y are the de-noising image and given image respectively. And ∇X represents the gradient of X. β is a constant. In Equation 10, the first item indicates the difference between de-noising image and given image, while the second item indicates the smoothness of the de-noising image. In the illustrated embodiments described below, Alternating Direction Method of Multipliers (ADMM) algorithm proposed by Wahlberg (2012) was adopted to solve the convex optimization presented in Equation 10.

2.2 Automated Region of Noise (RON) for Real Images.

In some embodiments, the region of noise (RON) is determined automatically, for example using landmarks as described above. In an illustrated embodiment, a RON is determined objectively and automatically without manual input based on a predetermined selection of a tissue type to use as a region of noise. Anatomically homogenous regions are extracted as noise regions for the learning of image noise pattern. For example, for CT measurement modalities, it was recognized that anatomical homogenous regions include muscle, fat, lung parenchyma, trachea or bone. In other measurement modalities, e.g., MRI, other tissue types or combinations are expected to be associated with homogeneous regions. At least a quick and approximate automatic segmentation of at least one anatomically homogenous region is performed. The extracted homogenous regions can be of any size/shape. All parameters in the de-noising algorithm that require standard deviation of image intensity can be estimated from the extracted homogenous regions, which makes the de-noising algorithm more fully automated. In other embodiments, when the ROI is also automatically determined, the entire process is automatic, requiring no manual intervention after the type of feature for the ROI and anatomic tissue type for the RON are set.

FIG. 8 is a flow diagram that illustrates an example automated method 800 to determine a region of noise (RON), according to one embodiment. These steps are a specific embodiment of part of step 504 described in earlier flow charts for determining the voxels in the ROI and in the RON. In step 801, data is retrieved that indicates the tissue type to use for the RON. Step 801 includes determining the parameters for the quick and approximate segmentation to identify the voxels in the region of noise. For example, for some embodiments for scans using CT measurement modalities, the anatomically homogeneous tissue types are bone, muscle, fat, lung parenchyma and trachea defined by CT intensity ranges in Hounsfield units (HU) listed in Table. 1.

TABLE 1

CT intensity ranges for anatomically homogeneous regions.

| Homogenous region | Hounsfield Unit window |
|---|---|
| Bone | ≥200 |
| Muscle | [0, 200] |
| Fat | −300~0 |
| Lung parenchyma | −800~−300 |
| Trachea | ≤−800 |

For example, for a scan processed to detect lung lesions, it is decided to use muscle tissue as the region of noise. As a result, in step 801 data is retrieved indicating muscle region and the associated intensity range of 0 to 200 HU. In some embodiments, the RON is further limited by anatomical landmarks, e.g., for lung scans directed to imaging lung lesions in an area of interest, muscle and fat voxels to be used as a RON are limited to the chest wall a few centimeters from the outer surface of the image cross section. Such information is included in the information retrieved during step 801.

In step 803, The voxels of a current image are determined, which fall within the intensity range (or within the anatomical landmarks or some combination) for the indicated tissue type.

In step 805, A binary mask is formed, with one value (e.g., 1) for voxels that satisfy the definition for the anatomically homogeneous region (e.g., within the specified intensity range 0 to 200 HU) and the other value (e.g., 0) for voxels that fall outside the definition. In some embodiments, step 805 includes some further processing, e.g., a closing operation is performed on the masks of homogenous regions with a scale of 3 mm, which has the effect of eliminating islands in the mask of smaller size. If the mask overlaps the region of interest (ROI), the voxels in the ROI are also removed from the mask during step 805. The resulting mask is then made up of voxels that tend to be contiguous in relatively large groups, suitable for the block sizes being used in the subsequent de-noising steps of FIG. 5 or FIG. 6.

FIG. 9A and FIG. 9B are images that illustrate an example automatically-determined RON, according to one embodiment. FIG. 9A is an image of a cross sectional CT scan showing two lungs and a circular trachea as the darkest areas. In this example, muscle is selected as the anatomically homogeneous area, and the voxels that fall automatically within the RON are depicted in FIG. 9B as cross hatched area 950.

In some embodiments, the method 800 includes step 807. In step 807, the scan data intensity values covered by the mask are preprocessed, e.g., by smoothing or removing highest or lowest values, or both, in each 9×9 block. In an example embodiment, no preprocessing step is performed; and, step 807 is omitted.

In step 809 the mask for the RON and any pre-processed voxels are passed to subsequent steps of the de-noising process, e.g., the steps following step 504 in FIG. 5 and in FIG. 6.

2.3 Fully Automated Embodiment on Real Lung Images.

In some embodiments, the region of interest is also determined automatically using any means known in the art. For example, in some embodiments, lung lesions or lymph nodes are detected automatically using the methods described in U.S. Pat. No. 8,355,552 or US Publ. 2015/0078641. In the following embodiment, both the region of interest and the region of noise are determined automatically, where the ROI is defined automatically for lung lesions and the RON is determined automatically based on the data retrieved for muscle tissue. In each case, the insert showing the de-noised region of interest removes noise apparent in the insert for the original ROI.

Figure 10A:
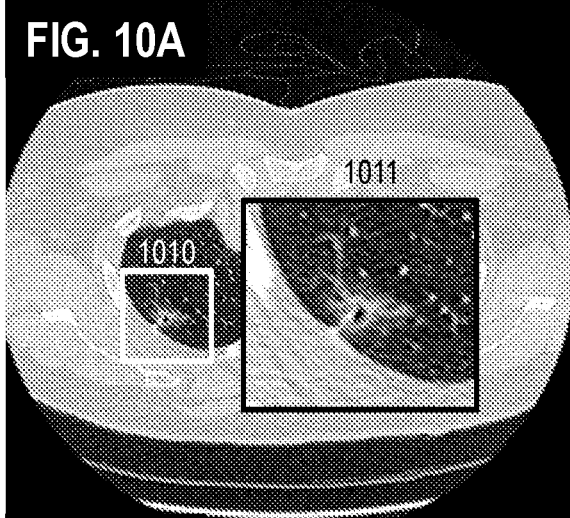
FIG. 10A and FIG. 10B are images that illustrate an example region of interest in a lung before and after automated de-noising, respectively, according to one embodiment.
Figure 10B:
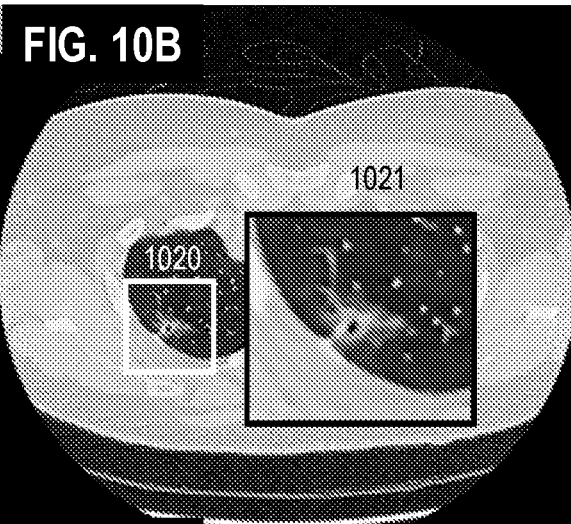

FIG. 10A and FIG. 10B are images that illustrate an example region of interest in a lung before and after automated de-noising, respectively, according to one embodiment. In FIG. 10A the original region of interest is indicated by box 1010 and the insert 1011 shows a portion of the ROI enlarged. FIG. 10B shows the image after fully automatic de-noising with the region of interest indicated by box 1020 and the insert 1021 depicting a portion of the ROI enlarged to clearly show the removal of noise apparent in the original ROI 1011.

Figure 11A:
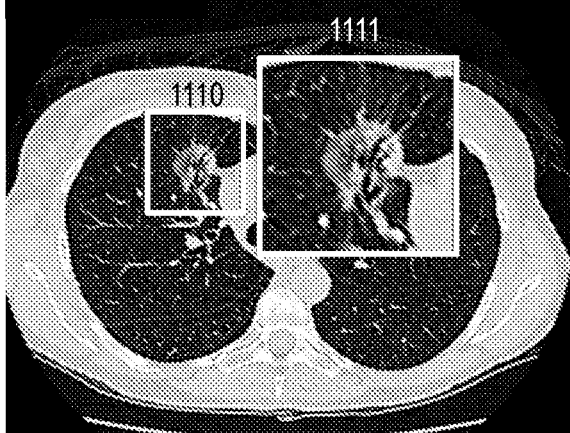
FIG. 11A and FIG. 11B are images that illustrate an example region of interest in a lung before and after automated de-noising, respectively, according to one embodiment.
Figure 11B:
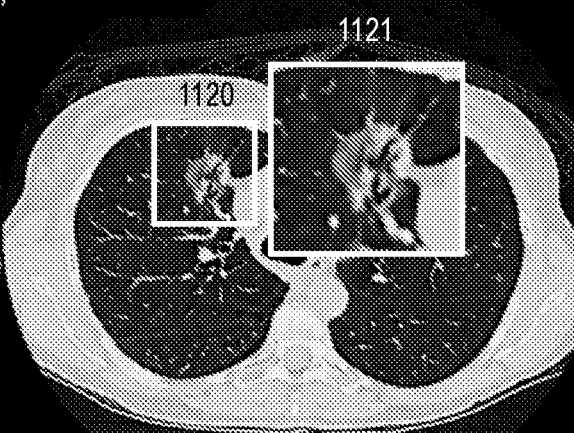

FIG. 11A and FIG. 11B are images that illustrate an example region of interest in a lung before and after automated de-noising, respectively, according to one embodiment. In FIG. 11A the original region of interest is indicated by box 1110 and the insert 1111 shows the ROI enlarged. FIG. 11B shows the image after fully automatic de-noising with the region of interest indicated by box 1120 and the insert 1121 depicting the ROI enlarged to clearly show the removal of noise apparent in the original ROI 1111.

Figure 12A:
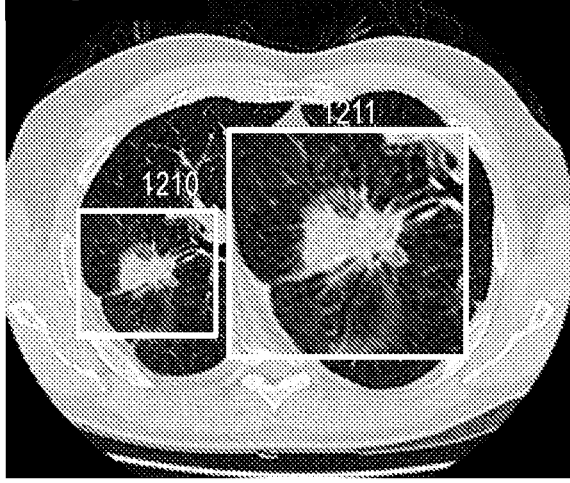
FIG. 12A and FIG. 12B are images that illustrate an example region of interest in a lung before and after automated de-noising, respectively, according to one embodiment.
Figure 12B:

FIG. 12A and FIG. 12B are images that illustrate an example region of interest in a lung before and after automated de-noising, respectively, according to one embodiment. In FIG. 12A the original region of interest is indicated by box 1210 and the insert 1211 shows the ROI enlarged. FIG. 12B shows the image after fully automatic de-noising with the region of interest indicated by box 1220 and the insert 1221 depicting the ROI enlarged to clearly show the removal of noise apparent in the original ROI 1211.

3. PROCESSING HARDWARE OVERVIEW

FIG. 13 is a block diagram that illustrates a computer system 1300 upon which an embodiment of the invention may be implemented. Computer system 1300 includes a communication mechanism such as a bus 1310 for passing information between other internal and external components of the computer system 1300. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit).). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1300, or a portion thereof, constitutes a means for performing one or more steps of one or more methods described herein.

A sequence of binary digits constitutes digital data that is used to represent a number or code for a character. A bus 1310 includes many parallel conductors of information so that information is transferred quickly among devices coupled to the bus 1310. One or more processors 1302 for processing information are coupled with the bus 1310. A processor 1302 performs a set of operations on information. The set of operations include bringing information in from the bus 1310 and placing information on the bus 1310. The set of operations also typically include comparing two or more units of information, shifting positions of units of information, and combining two or more units of information, such as by addition or multiplication. A sequence of operations to be executed by the processor 1302 constitutes computer instructions.

Computer system 1300 also includes a memory 1304 coupled to bus 1310. The memory 1304, such as a random access memory (RAM) or other dynamic storage device, stores information including computer instructions. Dynamic memory allows information stored therein to be changed by the computer system 1300. RAM allows a unit of information stored at a location called a memory address to be stored and retrieved independently of information at neighboring addresses. The memory 1304 is also used by the processor 1302 to store temporary values during execution of computer instructions. The computer system 1300 also includes a read only memory (ROM) 1306 or other static storage device coupled to the bus 1310 for storing static information, including instructions, that is not changed by the computer system 1300. Also coupled to bus 1310 is a non-volatile (persistent) storage device 1308, such as a magnetic disk or optical disk, for storing information, including instructions, that persists even when the computer system 1300 is turned off or otherwise loses power.

Information, including instructions, is provided to the bus 1310 for use by the processor from an external input device 1312, such as a keyboard containing alphanumeric keys operated by a human user, or a sensor. A sensor detects conditions in its vicinity and transforms those detections into signals compatible with the signals used to represent information in computer system 1300. Other external devices coupled to bus 1310, used primarily for interacting with humans, include a display device 1314, such as a cathode ray tube (CRT) or a liquid crystal display (LCD), for presenting images, and a pointing device 1316, such as a mouse or a trackball or cursor direction keys, for controlling a position of a small cursor image presented on the display 1314 and issuing commands associated with graphical elements presented on the display 1314.

In the illustrated embodiment, special purpose hardware, such as an application specific integrated circuit (IC) 1320, is coupled to bus 1310. The special purpose hardware is configured to perform operations not performed by processor 1302 quickly enough for special purposes. Examples of application specific ICs include graphics accelerator cards for generating images for display 1314, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1300 also includes one or more instances of a communications interface 1370 coupled to bus 1310. Communication interface 1370 provides a two-way communication coupling to a variety of external devices that operate with their own processors, such as printers, scanners and external disks. In general the coupling is with a network link 1378 that is connected to a local network 1380 to which a variety of external devices with their own processors are connected. For example, communication interface 1370 may be a parallel port or a serial port or a universal serial bus (USB) port on a personal computer. In some embodiments, communications interface 1370 is an integrated services digital network (ISDN) card or a digital subscriber line (DSL) card or a telephone modem that provides an information communication connection to a corresponding type of telephone line. In some embodiments, a communication interface 1370 is a cable modem that converts signals on bus 1310 into signals for a communication connection over a coaxial cable or into optical signals for a communication connection over a fiber optic cable. As another example, communications interface 1370 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 1370 sends and receives electrical, acoustic or electromagnetic signals, including infrared and optical signals, that carry information streams, such as digital data.

The term computer-readable medium is used herein to refer to any medium that participates in providing information to processor 1302, including instructions for execution. Such a medium may take many forms, including, but not limited to, non-volatile media, volatile media and transmission media. Non-volatile media include, for example, optical or magnetic disks, such as storage device 1308. Volatile media include, for example, dynamic memory 1304. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 1302, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 1302, except for carrier waves and other signals.

Logic encoded in one or more tangible media includes one or both of processor instructions on a computer-readable storage media and special purpose hardware, such as ASIC*620.

Network link 1378 typically provides information communication through one or more networks to other devices that use or process the information. For example, network link 1378 may provide a connection through local network 1380 to a host computer 1382 or to equipment 1384 operated by an Internet Service Provider (ISP). ISP equipment 1384 in turn provides data communication services through the public, world-wide packet-switching communication network of networks now commonly referred to as the Internet 1390. A computer called a server 1392 connected to the Internet provides a service in response to information received over the Internet. For example, server 1392 provides information representing video data for presentation at display 1314.

The invention is related to the use of computer system 1300 for implementing the techniques described herein. According to one embodiment of the invention, those techniques are performed by computer system 1300 in response to processor 1302 executing one or more sequences of one or more instructions contained in memory 1304. Such instructions, also called software and program code, may be read into memory 1304 from another computer-readable medium such as storage device 1308. Execution of the sequences of instructions contained in memory 1304 causes processor 1302 to perform the method steps described herein. In alternative embodiments, hardware, such as application specific integrated circuit 1320, may be used in place of or in combination with software to implement the invention. Thus, embodiments of the invention are not limited to any specific combination of hardware and software.

The signals transmitted over network link 1378 and other networks through communications interface 1370, carry information to and from computer system 1300. Computer system 1300 can send and receive information, including program code, through the networks 1380, 1390 among others, through network link 1378 and communications interface 1370. In an example using the Internet 1390, a server 1392 transmits program code for a particular application, requested by a message sent from computer 1300, through Internet 1390, ISP equipment 1384, local network 1380 and communications interface 1370. The received code may be executed by processor 1302 as it is received, or may be stored in storage device 1308 or other non-volatile storage for later execution, or both. In this manner, computer system 1300 may obtain application program code in the form of a signal on a carrier wave.

Various forms of computer readable media may be involved in carrying one or more sequence of instructions or data or both to processor 1302 for execution. For example, instructions and data may initially be carried on a magnetic disk of a remote computer such as host 1382. The remote computer loads the instructions and data into its dynamic memory and sends the instructions and data over a telephone line using a modem. A modem local to the computer system 1300 receives the instructions and data on a telephone line and uses an infra-red transmitter to convert the instructions and data to a signal on an infra-red carrier wave serving as the network link 1378. An infrared detector serving as communications interface 1370 receives the instructions and data carried in the infrared signal and places information representing the instructions and data onto bus 1310. Bus 1310 carries the information to memory 1304 from which processor 1302 retrieves and executes the instructions using some of the data sent with the instructions. The instructions and data received in memory 1304 may optionally be stored on storage device 1308, either before or after execution by the processor 1302.

FIG. 14 illustrates a chip set 1400 upon which an embodiment of the invention may be implemented. Chip set 1400 is programmed to perform one or more steps of a method described herein and includes, for instance, the processor and memory components described with respect to FIG. 1 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1400, or a portion thereof, constitutes a means for performing one or more steps of a method described herein.

In one embodiment, the chip set 1400 includes a communication mechanism such as a bus 1401 for passing information among the components of the chip set 1400. A processor 1403 has connectivity to the bus 1401 to execute instructions and process information stored in, for example, a memory 1405. The processor 1403 may include one or more processing cores with each core configured to perform independently. A multi-core processor enables multiprocessing within a single physical package. Examples of a multi-core processor include two, four, eight, or greater numbers of processing cores. Alternatively or in addition, the processor 1403 may include one or more microprocessors configured in tandem via the bus 1401 to enable independent execution of instructions, pipelining, and multithreading. The processor 1403 may also be accompanied with one or more specialized components to perform certain processing functions and tasks such as one or more digital signal processors (DSP) 1407, or one or more application-specific integrated circuits (ASIC) 1409. A DSP 1407 typically is configured to process real-world signals (e.g., sound) in real time independently of the processor 1403. Similarly, an ASIC 1409 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1403 and accompanying components have connectivity to the memory 1405 via the bus 1401. The memory 1405 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 1405 also stores the data associated with or generated by the execution of one or more steps of the methods described herein.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article. As used herein, unless otherwise clear from the context, a value is "about" another value if it is within a factor of two (twice or half) of the other value.

4. REFERENCES

In some embodiments, processes in the following are used.

Elad, M., and M. Aharon, "Image Denoising via Sparse and Redundant Representations over Learned Dictionaries," *IEEE Transactions on Image Processing*, v15(12), pp 3736-3745, 2006.

Schwartz, L., B. Zhao and J. Yan, "Automated determination of lymph nodes in scanned images," U.S. Pat. No. 8,355, 552, Jan. 15, 2013.

Tan, Y., B. Zhao and L. Schwartz, "Techniques for Segmentation of Lymph Nodes, Lung Lesions and Other Solid or Part-Solid Objects," US Publ. 2015/0078641, Mar. 19, 2015.

Wahlberg B, Boyd S, Annergren M, et al. "An ADMM algorithm for a class of total variation regularized estimation problems" *IFAC Proceedings Volumes*, v45(16): 83-88, 2012.

What is claimed is:

1. A method comprising:
   a) obtaining automatically on a processor a cross sectional scan comprising one or more cross sectional 2D images;
   b) obtaining a first subset of pixels in a region of interest within the cross sectional scan and a second subset of pixels in a non-overlapping region of noise within the cross sectional scan;
   c) determining automatically on a processor a plurality of sample blocks in a first image based on the region of interest and a plurality of atoms for the sample blocks in the first image, wherein each atom contributes to a weighted sum that approximates at least one sample block in the first image, and wherein each sample block and atom has a same predetermined size that is less than a size of the first image;
   d) determining automatically on a processor a plurality of sample blocks in a second image based on the region of noise and a plurality of atoms for the sample blocks in the second image, wherein each atom contributes to a weighted sum that approximates at least one sample block in the second image, and wherein each sample block and atom has the same predetermined size that is less than a size of the second image;
   e) determining automatically on a processor for each atom from the first image a value for a measure of similarity with a plurality of atoms from the second image;
   f) for each atom from the first image, removing automatically on a processor an atom from the first image, if the value of the measure of similarity is above a predetermined threshold value, whereby the atom from the first image is considered to characterize noise;
   g) reconstructing a de-noised cross sectional scan in the region of interest automatically on a processor based on atoms remaining in the first image after removing the atom from the first image; and
   h) presenting automatically on a display device, the reconstructed de-noised cross sectional scan in the region of interest.

2. A method as recited in claim 1, wherein the first subset of pixels is input manually by a user.

3. A method as recited in claim 1, wherein the second subset of pixels is input manually by a user.

4. A method as recited in claim 1, wherein the first subset of pixels is determined automatically on a processor based on landmarks recognized in the cross sectional scan.

5. A method as recited in claim 1, wherein the second subset of pixels is determined automatically on a processor based on landmarks recognized in the cross sectional scan.

6. A method as recited in claim 1, wherein the first image is a sub-band image of interest produced by an orthogonal basis function transform of the region of interest and the second image is a sub-band image of noise produced by the orthogonal basis function transform of the region of noise.

7. The method as recited in claim 6, wherein the orthogonal basis function transform is a discrete stationary wavelet transform.

8. A method as recited in claim 7, wherein the discrete stationary wavelet transform is based on a wavelet filter selected from a group comprising a Haar wavelet filter, a Daubechies wavelet filter, and a Coiflets wavelet filter.

9. A method as recited in claim 1, wherein the measure of similarity is mutual information.

10. A method as recited in claim 1, wherein the plurality of atoms in each of the first image and the second image is a corresponding plurality of sparse and redundant basis functions.

11. A method as recited in claim 10, wherein the plurality of sparse and redundant basis functions are learned from initial atoms for the plurality of sample blocks in each of the first image and the second image.

12. A method as recited in claim 11, wherein the initial atoms for the plurality of sample blocks are based on discrete Cosine transforms (DCTs).

13. A method as recited in claim 10, wherein less than five atoms in each of the first image and the second image contribute to the weighted sum that approximates at least one sample block in each of the first image and the second image.

14. A method as recited in claim 1, wherein the plurality of sample blocks in each of the first image and the second image are contiguous and non-overlapping.

15. A method as recited in claim 1, wherein the plurality of sample blocks in each of the first image and the second image are non-contiguous and overlapping.

16. A method as recited in claim 1, wherein the first image is the region of interest and the second image is the region of noise.

17. A method as recited in claim 6, wherein step g) comprises obtaining a de-noised sub-band image of interest based on the atoms remaining in the sub-band image of interest after removing the atom from the sub-band image of interest and performing an inverse orthogonal basis function transform on the de-noised sub-band image of interest to obtain the de-noised cross sectional scan in the region of interest.

18. A method as recited in claim 17, further comprising repeating steps c), d), e) and f) for a second sub-band image of interest image produced by a second orthogonal basis function transform of the region of interest and the region of noise, wherein step g) further comprises performing an inverse transform of the second orthogonal basis function on the de-noised sub-band image of interest to obtain the de-noised cross sectional scan in the region of interest.

19. A method as recited in claim 17, wherein a low frequency residual sub-band image remains after the orthogonal basis function transform, the method further comprising performing a level-2 orthogonal basis function transform of the low frequency residual sub-band image to produce a level-2 high frequency sub-band image and repeating steps c), d), e), and f) for the level-2 high frequency sub-band image wherein step g further comprises performing an inverse transform of the level-2 high frequency sub-band image on the de-noised sub-band image of interest to obtain the de-noised cross sectional scan in the region of interest.

20. A method as recited in claim 1, wherein the second subset of pixels is determined automatically on a processor based on a predetermined intensity range for a tissue type.

21. A method as recited in claim 20, wherein the tissue type is selected from a group consisting of bone, muscle, fat, lung parenchyma and trachea.

22. A method as recited in claim 21, wherein the predetermined intensity range for a CT image is: ≥about 200 Hounsfield Units (HU) for bone; about 0 to about 200 HU for muscle; about −300 to about 0 HU for fat, about −800 to about −300 HU for lung parenchyma; and ≤about −800 HU for trachea.

23. An apparatus comprising:
a display device;
at least one processor; and
at least one memory chip including one or more sequences of instructions;
the at least one memory chip and the one or more sequences of instructions configured to, with the at least one processor, cause the processor to perform at least the following,
obtain a cross sectional scan comprising one or more cross sectional 2D images;
obtain a first subset of pixels in a region of interest within the cross sectional scan and a second subset of pixels in a non-overlapping region of noise within the cross sectional scan;
automatically determine a plurality of sample blocks in a first image based on the region of interest and a plurality of atoms for the sample blocks in the first image, wherein each atom contributes to a weighted sum that approximates at least one sample block in the first image, and wherein each sample block and atom has a same predetermined size that is less than a size of the first image;
automatically determine a plurality of sample blocks in a second image based on the region of noise and a plurality of atoms for the sample blocks in the second image, wherein each atom contributes to a weighted sum that approximates at least one sample block in the second image, and wherein each sample block and atom has the same predetermined size that is less than a size of the second image;
automatically determine for each atom from the first image a value for a measure of similarity with a plurality of atoms from the second image;
for each atom from the first image, automatically remove an atom from the first image, if the value of the measure of similarity is above a predetermined threshold value, whereby the atom from the first image is considered to characterize noise;
automatically reconstruct a de-noised cross sectional scan in the region of interest based on atoms remaining in the first image after removing the atom from the first image; and
automatically present the reconstructed de-noised cross sectional scan in the region of the interest on the display device.

24. A Non-transitory computer-readable medium carrying one or more sequences of instructions, wherein execution of the one or more sequences of instructions by one or more processors causes the one or more processors to perform the steps of:
automatically obtaining a cross sectional scan comprising one or more cross sectional 2D images;
obtaining a first subset of pixels in a region of interest within the cross sectional scan and a second subset of pixels in a non-overlapping region of noise within the cross sectional scan;
automatically determining a plurality of sample blocks in a first image based on the region of interest and a plurality of atoms for the sample blocks in the first image, wherein each atom contributes to a weighted sum that approximates at least one sample block in the first image, and wherein each sample block and atom has a same predetermined size that is less than a size of the first image;
automatically determining a plurality of sample blocks in a second image based on the region of noise and a plurality of atoms for the sample blocks in the second image, wherein each atom contributes to a weighted sum that approximates at least one sample block in the second image, and wherein each sample block and atom has the same predetermined size that is less than a size of the second image;
automatically determining for each atom from the first image a value for a measure of similarity with a plurality of atoms from the second image;
for each atom from the first image, automatically removing an atom from the first image, if the value of the measure of similarity is above a predetermined threshold value, whereby the atom from the first image is considered to characterize noise;
automatically reconstructing a de-noised cross sectional scan in the region of interest based on atoms remaining in the first image after removing the atom from the first image; and
automatically presenting the reconstructed de-noised cross sectional scan in the region of interest on a display device.

* * * * *